(12) United States Patent
Liu et al.

(10) Patent No.: US 12,543,167 B2
(45) Date of Patent: Feb. 3, 2026

(54) INFORMATION TRANSMISSION METHOD AND COMMUNICATION DEVICE

(71) Applicant: VIVO MOBILE COMMUNICATION CO., LTD., Dongguan (CN)

(72) Inventors: Siqi Liu, Dongguan (CN); Zichao Ji, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 396 days.

(21) Appl. No.: 18/157,897

(22) Filed: Jan. 23, 2023

(65) Prior Publication Data
US 2023/0164771 A1 May 25, 2023

Related U.S. Application Data

(63) Continuation of application No. PCT/CN2021/107384, filed on Jul. 20, 2021.

(30) Foreign Application Priority Data

Jul. 23, 2020 (CN) .......................... 202010718812.5

(51) Int. Cl.
*H04W 72/1263* (2023.01)
*H04L 1/00* (2006.01)

(52) U.S. Cl.
CPC ....... *H04W 72/1263* (2013.01); *H04L 1/0038* (2013.01)

(58) Field of Classification Search
CPC .............. H04W 72/1263; H04W 72/23; H04L 1/0038; H04L 5/0053; H04L 5/001; H04L 5/0094; H04L 5/0044
See application file for complete search history.

(56) References Cited

U.S. PATENT DOCUMENTS 10,785,006 B2* 9/2020 Jo ........................... H04J 11/00
11,147,066 B2* 10/2021 Yi .......................... H04L 5/0053
(Continued)

FOREIGN PATENT DOCUMENTS

CN  109314848 A  2/2019
CN  110475356 A  11/2019
(Continued)

OTHER PUBLICATIONS

China National Intellectual Property Administration, International Search Report issued in corresponding Application No. PCT/CN2021/107384, mailed Oct. 28, 2021.
(Continued)

*Primary Examiner* — Chandrahas B Patel
(74) *Attorney, Agent, or Firm* — The Webb Law Firm

(57) ABSTRACT

This application discloses an information transmission method, which includes: determining, according to a scheduling configuration of a first cell and/or a second cell of a terminal, a target blind detection budget and/or a target mapping manner of the terminal, where the second cell supports scheduling by the first cell, or the second cell supports self-scheduling and the second cell supports scheduling by the first cell; and performing information transmission according to the target blind detection budget and/or the target mapping manner, where the target blind detection budget includes at least one of: a blind detection budget in the first cell; a blind detection budget in the second cell; or a joint blind detection budget in the first cell and the second cell; and the target mapping manner is a mapping manner in which control elements of the first cell and/or the second cell are mapped to physical control resources.

18 Claims, 4 Drawing Sheets

(56) References Cited

U.S. PATENT DOCUMENTS

| | | |
|---|---|---|
| 2018/0020443 A1 | 1/2018 | Lee et al. |
| 2018/0176942 A1 | 6/2018 | Kim et al. |
| 2020/0154412 A1 | 5/2020 | Lee et al. |
| 2020/0305179 A1* | 9/2020 | Li .................. H04W 72/23 |
| 2021/0144571 A1 | 5/2021 | Ji |
| 2023/0261783 A1* | 8/2023 | Fu .................. H04L 1/0038 |
| | | 370/329 |

FOREIGN PATENT DOCUMENTS

| | | |
|---|---|---|
| CN | 110740479 A | 1/2020 |
| WO | 2013155680 A1 | 10/2013 |
| WO | 2020015730 A1 | 1/2020 |

OTHER PUBLICATIONS

Nokia et al., "Remaining details on search space", 3GPP TSG RAN WG1 #93, Busan, South Korea, May 21-25, 2018, R1-1806142.

Panasonic, "Maintenance for physical downlink control channel", 3GPP TSG RAN WG1 Meeting #94bis, Chengdu, China, Oct. 8-12, 2018, R1-1811397.

Qualcomm Incorporated, "Remaining issues on control resource set and search space", 3GPP TSG RAN WG1 Meeting #92bis, Sanya, China, Apr. 16-20, 2018, R1-1804798.

* cited by examiner

INFORMATION TRANSMISSION METHOD AND COMMUNICATION DEVICE

CROSS-REFERENCE TO RELATED APPLICATIONS

The present application is a continuation of International Application No. PCT/CN2021/107384, filed on Jul. 20, 2021, which claims priority to Chinese Patent Application No. 202010718812.5 entitled "INFORMATION TRANSMISSION METHOD AND APPARATUS, AND COMMUNICATION DEVICE" filed with the China National Intellectual Property Administration on Jul. 23, 2020, which are incorporated herein by reference in their entireties.

TECHNICAL FIELD

This application relates to the field of wireless communications technologies, and in particular, to an information transmission method and apparatus, and a communication device.

BACKGROUND

The fifth generation (5G) new radio (NR) system supports carrier aggregation (CA), which can configure and activate a plurality of component carriers (CC) or cells for user equipment (UE), and supports cross-carrier scheduling under CA. In addition, NR further supports the scenario of multiple transmission and reception panel (M-TRP), and the UE can schedule, and send and receive data by a plurality of TRPs. In the current NR system, one cell can only be scheduled by one scheduling cell (that is, the cell can only be scheduled by itself or by another cell), and a primary cell (PCell) can only be scheduled by the primary cell itself.

To enhance coverage of a control channel, Pcells are generally deployed on carriers of low frequency bands. In another aspect, the carriers of low frequency bands have insufficient bandwidths and have been deployed in large quantities to other systems (for example, LTE systems). Therefore, carriers of high frequency bands may be configured as SCells, and Pcells are scheduled by the SCells, to solve the problem of limited PCell control channel capacity and reduce overheads of a physical downlink control channel (PDCCH) on the PCells.

Currently, NR maintains a blind detection budget for each scheduled cell. In the case of limited CA, the blind detection budget may be related to subcarrier spacing (SCS) of a scheduling cell and a quantity of cells scheduled by the scheduling cell. In a case that an SCell that schedules a PCell or a secondary cell group where the SCell is located is indicated to be dormant by downlink control information (DCI) of the PCell or the Scell, if blind detection budgeting or mapping is still performed in the existing manner without considering the configuration of the Pcell and/or the Scell, a portion of the blind detection quantity cannot be used, affecting the PDCCH capacity and scheduling efficiency.

SUMMARY

According to a first aspect of the present disclosure, an information transmission method is provided, applied to a communication device. The method includes: determining, according to a scheduling configuration of a first cell and/or a second cell of a terminal, a target blind detection budget and/or a target mapping manner of the terminal, where the second cell supports scheduling by the first cell, or the second cell supports self-scheduling and the second cell supports scheduling by the first cell; and performing information transmission according to the target blind detection budget and/or the target mapping manner, where the target blind detection budget includes at least one of the following: a blind detection budget in the first cell; a blind detection budget in the second cell; or a joint blind detection budget in the first cell and the second cell; and the target mapping manner is a mapping manner in which control elements of the first cell and/or the second cell are mapped to physical control resources.

According to a second aspect of the present disclosure, an information transmission apparatus is provided, including: a determining module, configured to determine, according to a scheduling configuration of a first cell and/or a second cell of a terminal, a target blind detection budget and/or a target mapping manner of the terminal, where the second cell supports scheduling by the first cell, or the second cell supports self-scheduling and the second cell supports scheduling by the first cell; and a transmission module, configured to perform information transmission according to the target blind detection budget and/or the target mapping manner, where the target blind detection budget includes at least one of the following: a blind detection budget in the first cell; a blind detection budget in the second cell; or a joint blind detection budget in the first cell and the second cell; and the target mapping manner is a mapping manner in which control elements of the first cell and/or the second cell are mapped to physical control resources.

According to a third aspect of the present disclosure, a communication device is provided. The terminal includes a processor, a memory, and a program or instructions stored in the memory and runnable on the processor, the program or the instructions, when executed by the processor, implementing the steps of the method according to the first aspect.

According to a fourth aspect of the present disclosure, a readable storage medium is provided, storing a program or instructions, the program or the instructions, when executed by a processor, implementing the steps of the method according to the first aspect.

According to a fifth aspect of the present disclosure, a chip is provided, where the chip includes a processor and a communication interface, the communication interface is coupled to the processor, and the processor is configured to run a program or instructions of a communication device to implement the method according to the first aspect.

DETAILED DESCRIPTION

The technical solutions in the embodiments of this application are clearly described in the following with reference to the accompanying drawings in the embodiments of this application. It is obvious that the embodiments to be described are only a part rather than all of the embodiments of this application. All other embodiments obtained by a person skilled in the art based on the embodiments of this application without creative efforts shall fall within the protection scope of this application.

The specification and claims of this application, and terms "first" and "second" are used to distinguish similar objects, but are not used to describe a specific sequence or order. It is to be understood that the data termed in this way are interchangeable in a proper case, so that the embodiments of this application can be implemented in other orders than the orders illustrated or described herein. Moreover, the objects distinguished by "first" and "second" are usually of one type, and the quantity of objects is not limited. For example, there may be one or more first objects. In addition, "and/or" in the description and claims represents at least one of connected objects, and the character "/" generally indicates an "or" relationship between associated objects.

It should be noted that the technologies described in the embodiments of this application are not limited to a long term evolution (LTE)/LTE-advanced (LTE-A) system, and may be further applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms "system" and "network" may be used interchangeably in the embodiments of this application. The technology described in the present disclosure can be applied to the systems and radio technologies mentioned above, and can also be applied to other systems and radio technologies. However, the following description describes a new radio (NR) system for illustrative purposes, and NR terminology is used in most of the description below, although these technologies are also applicable to applications other than NR system applications, for example, the 6th generation (6G) communication system.

Figures 1, 2:
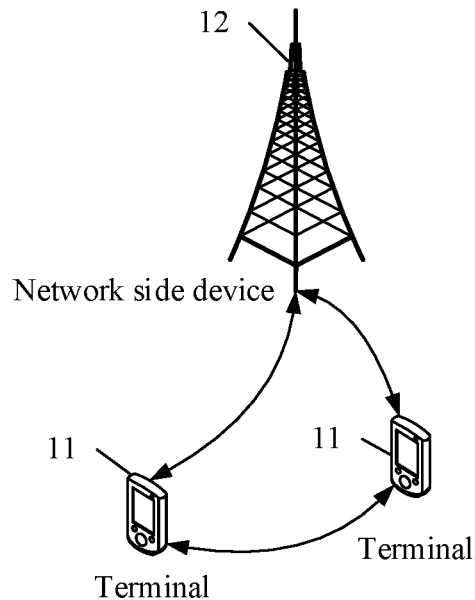
FIG. 1 is a block diagram of a wireless communication system to which an embodiment of this application can be applied.
FIG. 2 is a schematic flowchart of an information transmission method according to an embodiment of this application.

FIG. 1 is a block diagram of a wireless communication system to which an embodiment of this application can be applied. The communication system includes a terminal device 11 and a network side device 12. The terminal 11 may be alternatively referred to as a terminal device or user equipment (UE). The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes: bracelets, earphones, glasses, and the like. It should be noted that, the specific type of the terminal 11 is not limited in this embodiment of this application. The network side device 12 may be a base station or a core network, where the base station may be referred to as a Node B, an evolved Node B, an access point, a base transceiver station (BTS), a radio base station, a radio transceiver, a basic service set (BSS), an extended service set (ESS), a Node B, an evolved Node B (eNB), a Home Node B, a Home evolved Node B, a WLAN access point, a Wi-Fi Node, a transmitting receiving point (TRP), or another suitable term in the field. As long as the same technical effect is achieved, the base station is not limited to a specific technical vocabulary. It should be noted that, only a base station in an NR system is used as an example in the embodiments of this application, and the specific type of the base station is not limited.

An information transmission solution provided in the embodiments of this application is described in detail below with reference to the accompanying drawings by using specific embodiments and application scenarios.

FIG. 2 is a schematic flowchart of an information transmission method according to an embodiment of this application. The method 200 may be performed by a communication device. In other words, the method may be performed by software or hardware installed on the communication device, where the communication device may be the terminal 11 shown in FIG. 1 or the network side device 12 shown in FIG. 1, which is not specifically limited in this embodiment. As shown in FIG. 2, the method may include the following steps.

S210: Determine, according to a scheduling configuration of a first cell and/or a second cell of a terminal, a target blind detection budget and/or a target mapping manner of the terminal.

In this embodiment of this application, the second cell supports scheduling by the first cell, or the second cell supports self-scheduling and the second cell supports scheduling by the first cell. For example, the first cell may be an Scell, and the second cell may be a Pcell.

In this embodiment of this application, the target blind detection budget includes at least one of the following: a blind detection budget in the first cell; a blind detection budget in the second cell; or a joint blind detection budget in the first cell and the second cell. The target blind detection budget further includes the blind detection budget of the first cell and/or the second cell, which may be determined according to the scheduling configuration of the first cell and/or the second cell.

In this embodiment of this application, the target mapping manner is a mapping manner in which control elements of the first cell and/or the second cell are mapped to physical control resources. The physical control resources include physical control resources of the first cell and/or the second cell.

In this embodiment of this application, the scheduling configuration may be scheduling configuration information configured according to whether the first cell and/or the second cell satisfies a predetermined condition, for example, scheduling configuration information configured according to whether the first cell and/or the second cell is in a sleep state and/or in an inactive state.

In a possible implementation, the scheduling configuration of the first cell and the second cell includes any one of the following: a first scheduling configuration, a second scheduling configuration, or a third scheduling configuration.

In the foregoing possible implementation, the first scheduling configuration is that the first cell supports scheduling of the second cell and the second cell does not support self-scheduling, or the first cell supports scheduling of the second cell and the second cell does not support scheduling of any cell. That is, in the first scheduling configuration, the second cell can only be scheduled by the first cell, and the second cell at least cannot be self-scheduled. For example, the second cell is indicated to be dormant (dormant) or indicated to be deactivated. Alternatively, the second cell may be indicated to be dormant and indicated to be deactivated through downlink control information (DCI). Alternatively, the second cell may be indicated to be dormant and indicated to be deactivated through a Media Access Control (MAC) control element (CE). Alternatively, the second cell may be indicated to be dormant and indicated to be deactivated through Radio Resource Control (RRC) signaling. Certainly, this is not limited thereto. Alternatively, a first timer of the second cell times out, and the second cell enters a deactivated state; or a second timer of a BWP of the second cell times out, and a first target BWP of the second cell enters the deactivated state. The first timer may be a cell inactive timer (cell inactive timer), and the second timer may be a BWP inactive timer (BWP inactive timer) of the first target BWP. This is not specifically limited in this embodiment of this application.

The second scheduling configuration is that control information in a common search space (CSS) of the second cell supports self-scheduling of the second cell, and the first cell supports scheduling of the second cell. That is, the CSS self-scheduling of the deactivated second cell is activated in the second scheduling configuration.

In a possible implementation, if the scheduling configuration is the second scheduling configuration and a first condition is satisfied, the control information in the CSS of the second cell can schedule the second cell, that is, the control information in the CSS of the second cell can be self-scheduled, or the second cell can only be scheduled by the control information in the CSS of the second cell. When the first condition is satisfied, the first cell cannot schedule the second cell. Therefore, in this possible implementation, if the first condition is satisfied, the second cell can or can only be scheduled through the control information in the CSS of the second cell. The control information may be at least one of DCI, MAC CE, PDCCH, or RRC.

The third scheduling configuration is that control information in the CSS and a terminal-specific search space (UE-specific Search Space, USS) of the second cell supports scheduling of the second cell, and the first cell supports scheduling of the second cell. That is, the CSS and the USS of the second cell are self-scheduled in the third scheduling configuration.

In a possible implementation, if the scheduling configuration is the second scheduling configuration, when the first condition is satisfied, the control information (for example, PDCCH or DCI) in the CSS and the USS of the second cell can schedule the second cell, that is, the control information in the CSS and the USS of the second cell can be self-scheduled, or the second cell can only be scheduled by the control information in the CSS and the USS of the second cell. When the first condition is satisfied, the first cell cannot schedule the second cell. Therefore, in this possible implementation, if the first condition is satisfied, the second cell can or can only be scheduled through the control information in the CSS and the USS of the second cell.

In a possible implementation, when determining the target mapping manner according to the scheduling configuration of the first cell and/or the second cell, mapping of the control elements of the first cell and/or the second cell may be performed in a scheduling time unit according to a mapping sequence. The mapping sequence may include at least one of the following (1) to (3):

(1) mapping self-scheduling control elements of a target cell on physical control resources of the target cell, and then mapping control elements of the target cell that schedule other cells, where the target cell includes the first cell or the second cell;

(2) performing mapping in descending order or ascending order of control element identifiers; or (3) mapping common control elements (for example, CSS) on the physical control resources of the target cell, and then mapping terminal-specific control elements (for example, USS).

A scheduling time unit may be an occasion (occasion), a duration (span), or a slot (slot), which is not specifically limited in this embodiment of this application.

S212: Perform information transmission according to the target blind detection budget and/or the target mapping manner.

After the target blind detection budget and/or the target mapping manner is determined according to the scheduling configuration of the first cell and/or the second cell of the terminal, information transmission is performed according to the target blind detection budget and/or the target mapping manner. For example, for a network side device, a blind detection quantity may be configured for the terminal according to the target blind detection budget; and for the terminal, blind detection may be performed according to the target blind detection budget to obtain scheduling information of each cell; and/or, the network side device maps the control elements of the first cell and/or the second cell to physical control resources according to the target mapping manner, and the terminal performs detection on the corresponding physical control resources according to the target mapping manner.

In this embodiment of this application, the control elements include, but are not limited to: a quantity of at least one of search space (SS), PDCCHs, or control channel elements (CCEs).

Through the technical solutions provided in the embodiments of this application, when the second cell of the terminal can be scheduled by the first cell, the target blind detection budget and/or the target mapping manner of the terminal are determined according to the scheduling configuration of the first cell and/or the second cell. Information transmission is then performed according to the target blind detection budget and/or the target mapping manner, so that the target blind detection budget and/or the target mapping manner of the terminal can be determined according to the scheduling configuration of the first cell and/or the second cell, to avoid affecting the PDCCH capacity and scheduling efficiency since a portion of the blind detection quantity cannot be used due to blind detection budgeting or mapping without considering the configuration of the Pcell and/or the Scell.

The following describes the determination of the target blind detection budget and the target mapping manner in the embodiments of this application respectively with respect to the scheduling configuration being the first scheduling configuration, the second scheduling configuration, and the third scheduling configuration.

1. The Scheduling Configuration is the First Scheduling Configuration

In a possible implementation, the communication device may determine that the scheduling configuration is the first scheduling configuration in a case that at least one of the following (1) to (4) is satisfied:

(1) First control information is transmitted, where the first control information indicates that the second cell or a second cell group is dormant, and the second cell group is a cell group in which the second cell is located.

The first control information indicates that the second cell or a second cell group is dormant, and the second cell group is a cell group in which the second cell is located.

For example, the first control information may be control information of the second cell, that is, dormancy indication (dormancy indication) indicated by the control information of the second cell indicates that the second cell or the second cell group is dormant; and/or, the first control information may be alternatively control information of the first cell, that is, dormancy indication (dormancy indication) indicated by the control information of the first cell indicates that the second cell or the second cell group is dormant.

The first control information includes but is not limited to: downlink control information (Downlink Control Information, DCI), control information transmitted through a Media Access Control (MAC) control element (CE), or control information configured by Radio Resource Control (RRC) signaling.

In this embodiment of this application, the first cell can schedule the second cell. In this case, it can be agreed through a protocol or configured on the network side: a) only (can) support the dormancy indication through the control information of the first cell; b) only (can) support the dormancy indication through the control information of the second cell; and c) (can) support both the dormancy indication of the control information of the second cell and the dormancy indication of the control information of the first cell. The communication device may agree through a protocol or configure on the network side, a cell for transmitting the first control information.

In this possible implementation, if the communication device is a network side device, transmitting the first control information means that the network side device sends the first control information to the terminal; and if the communication device is a terminal, transmitting the first control information means that the terminal receives the first control information.

(2) The second cell is deactivated.

For example, an inactive timer of the second cell is not configured, or the inactive timer of the second cell expires, or the deactivation of the second cell is indicated through MAC CE, RRC, or DCI.

In this possible implementation, in the case that the deactivation of the second cell is indicated through MAC CE, RRC, or DCI, if the communication device is a network side device, a deactivation instruction may be sent to the terminal, indicating that the second cell is deactivated. If the communication device is a terminal, the communication device is a terminal, and can receive the deactivation instruction sent by the network side device.

(3) A bandwidth part (Bandwidth Part, BWP) of the second cell is switched to a BWP that does not support scheduling of the second cell.

For example, the BWP that supports scheduling of the second cell is switched to the BWP that does not support scheduling of the second cell.

(4) The BWP of the second cell is deactivated.

For example, the second cell is not provided with a BWP inactive timer (inactive Timer) or the inactive Timer of the BWP of the second cell expires.

In the foregoing possible implementation, when any one of the foregoing (1) to (4) is satisfied, the communication device considers that the current configuration is the first scheduling configuration, or switches to the first scheduling configuration. In this case, it is considered that the second cell cannot be self-scheduled (but can schedule other cells), or that the second cell cannot schedule any cell. When (1) or (2) above is satisfied, the second cell is in a dormant or deactivated state, and the terminal cannot monitor network-side control information on the second cell, nor can it schedule a control element on the second cell. Therefore, the communication device considers that the second cell cannot schedule any cell. When (3) or (4) above is satisfied, the BWP of the second cell cannot schedule the BWP of the second cell, but can monitor the network-side control information on the second cell. Therefore, the second cell cannot be self-scheduled, but can schedule other cells.

That the second cell cannot be self-scheduled means that the network side device does send control information for scheduling the second cell in the second cell, and the terminal does not need to monitor control information for scheduling the second cell in the second cell; but the network side device can send control information for scheduling other cells in the second cell, and the terminal needs to monitor control information for scheduling other cells in the second cell. That the second cell cannot schedule any cell means that the network side device does not send control information for scheduling any cell in the second cell, and the terminal does not need to monitor control information for scheduling any cell in the second cell.

When the foregoing (1) to (4) are satisfied, a part of a blind detection quantity corresponding to the second cell may not be used, and it may be considered to reallocate this part of the blind detection capability of the terminal. For example, if the second cell cannot be self-scheduled, a maximum blind detection quantity of self-scheduling control elements of the second cell may be reduced; and if the second cell cannot schedule any cell, a maximum blind detection quantity of the control elements of the second cell may be reduced, and the reduced blind detection quantity may be allocated to the first cell.

In this embodiment of this application, in a case that the first cell can schedule the second cell, a search space considered when determining the target blind detection budget and/or the target mapping manner in this embodiment of this application includes, but is not limited to, at least one of the following:
1) a self-scheduling SS on the second cell, where the SS may be a CSS or a USS, or both the CSS and the USS may exist;
2) an SS of the first cell that schedules the second cell; or
3) an SS of the first cell that schedules another cell (referred to as a third cell in this embodiment for convenience of distinction). The SS used for self-scheduling of the first cell, and/or the SS used for scheduling the third cell may be included. The SS used for self-scheduling of the first cell and the SS used for scheduling the third cell may be the same SS or may be different. There may be a CSS or only a USS in the SSs of the first cell that schedule other cells.

In this embodiment of this application, optionally, the third cell may be a cell of the same type as the first cell, for example, both the third cell and the first cell are secondary cells.

In this embodiment of this application, at least one set of maximum blind detection parameters may be configured for each UE, and each set of maximum blind detection parameters may be provided with at least one of the following:
1) a maximum blind detection quantity P of the control elements of the second cell;
2) a maximum blind detection quantity P-self of self-scheduling control elements of the second cell;
3) a maximum blind detection quantity CR of control elements of the first cell that schedule the second cell;

4) a maximum blind detection quantity S of the control elements of the first cell;

5) a maximum blind detection quantity S-self of self-scheduling control elements of the first cell;

6) a maximum blind detection quantity S-other of control elements of the first cell that schedule the third cell;

7) a maximum blind detection quantity S-selfandother of control elements of the first cell that schedule the first cell and the third cell; or 8) a joint maximum blind detection quantity T of the control elements of the first cell and the second cell.

The following describes the determination of the target blind detection budget and the target mapping manner of the terminal respectively in a case that the scheduling configuration is the first scheduling configuration.

(1) Determination of the Target Blind Detection Budget

In a possible implementation, when any of the foregoing (1) to (4) is satisfied, blind detection of the control elements of the first cell that schedule the second cell (that is, SSs of the first cell that schedule the second cell) may be counted into the blind detection share of the second cell, that is, CR is taken as a part of P.

Therefore, in the foregoing possible implementation, the determining the target blind detection budget in S210 includes: determining, if the scheduling configuration is the first scheduling configuration, that a first blind detection upper limit is equal to a maximum blind detection quantity of the control elements of the second cell, where the first blind detection upper limit is a maximum blind detection quantity of control elements of the first cell that schedule the second cell; and/or determining, if the scheduling configuration is the first scheduling configuration, that a second blind detection upper limit is equal to 0, where the second blind detection upper limit is a maximum blind detection quantity of self-scheduling control elements of the second cell.

In this possible implementation, the maximum blind detection quantity of control elements of the first cell that schedule the second cell is set to the maximum blind detection quantity of the control elements of the second cell. That is, when the second cell cannot schedule any cell, the maximum blind detection quantity pre-allocated to the second cell may be used as the maximum blind detection quantity of control elements of the first cell that schedule the second cell, to make full use of the blind detection capability of the terminal; and/or, when the second cell cannot be self-scheduled, the maximum blind detection quantity of self-scheduling control elements of the second cell may be set to 0, to avoid the problem that the self-scheduling blind detection quantity pre-allocated to the second cell cannot be used since the second cell cannot be self-scheduled.

In another possible implementation, the determining the target blind detection budget in S210 may include: determining the target blind detection budget by using first maximum blind detection parameters corresponding to the first scheduling configuration if the scheduling configuration is the first scheduling configuration. In this possible implementation, a plurality of sets of maximum blind detection parameters may be configured for each terminal, and the target blind detection budget of the terminal is determined by using first maximum blind detection parameters corresponding to the first scheduling configuration if the scheduling configuration is the first scheduling configuration.

In the foregoing possible implementation, optionally, the terminal may be further provided with second maximum blind detection parameters, and in this case, the first maximum blind detection parameters and the second maximum blind detection parameters satisfy at least one of the following: a first blind detection upper limit in the first maximum blind detection parameters is greater than a first blind detection upper limit in the second maximum blind detection parameters, where the first blind detection upper limit is a maximum blind detection quantity of control elements of the first cell that schedule the second cell; or a third blind detection upper limit in the first maximum blind detection parameters is greater than a third blind detection upper limit in the second maximum blind detection parameters, where the third blind detection upper limit is a maximum blind detection quantity of the control elements of the first cell.

That is, in the foregoing possible implementation, the maximum blind detection quantity CR' of control elements of the first cell that schedule the second cell in the first maximum blind detection parameters is greater than the maximum blind detection quantity CR of control elements of the first cell that schedule the second cell in the second maximum blind detection parameters; and the maximum blind detection quantity S' of the control elements of the first cell in the first maximum blind detection parameters is greater than the maximum blind detection quantity S of the control elements of the first cell in the second maximum blind detection parameters.

That is, in this possible implementation, a larger blind detection quantity is configured for the control elements of the first cell that schedule the second cell in the first maximum blind detection parameters compared with that in the second maximum blind detection parameters, or a larger blind detection quantity is configured for the control elements of the first cell in the first maximum blind detection parameters compared with that in the second maximum blind detection parameters. That is, in this possible implementation, since the second cell cannot be self-scheduled or the second cell cannot schedule any cell in the first scheduling configuration, a blind detection quantity correspondingly configured for the second cell is not used. Therefore, the maximum blind detection quantity corresponding to the control elements of the first cell that schedule the second cell and/or the maximum blind detection quantity corresponding to the control elements of the first cell can be increased, to improve the capacity of the downlink control channel.

In the foregoing optional implementation, the second maximum blind detection parameters may be maximum blind detection parameters used when the second cell can be self-scheduled, the second cell can be self-scheduled and schedule other cells, and the first cell schedules the second cell, which is not specifically limited in this embodiment of this application.

In another possible implementation, when any of the foregoing (1) to (4) is satisfied, blind detection of the control elements of the first cell that schedule the second cell (that is, SSs of the first cell that schedule the second cell) may be counted into the blind detection share of the first cell, that is, CR is taken as a part of S.

Therefore, in the foregoing possible implementation, the determining the target blind detection budget in S210 may further include: determining, if the scheduling configuration is the first scheduling configuration, that a fourth blind detection upper limit is equal to 0, where the fourth blind detection upper limit is a maximum blind detection quantity of the control elements of the second cell, that is, it is determined that the maximum blind detection quantity of the control elements of the second cell is 0. That is, in this possible implementation, if any of the foregoing conditions (1) to (4) are satisfied, it is considered that the second cell cannot schedule any cells. Therefore, the maximum blind detection quantity of the control elements of the second cell is set to 0 to avoid waste of the maximum blind detection capability of the terminal.

Alternatively, in the foregoing possible implementation, the determining the target blind detection budget in S210 may include: determining the target blind detection budget by using third maximum blind detection parameters corresponding to the first scheduling configuration. In this possible implementation, a plurality of sets of maximum blind detection parameters may be configured for each terminal, and the target blind detection budget of the terminal is determined by using third maximum blind detection parameters corresponding to the first scheduling configuration if the scheduling configuration is the first scheduling configuration.

In the foregoing possible implementation, optionally, the terminal may be further provided with fourth maximum blind detection parameters, and in this case, the third maximum blind detection parameters and the fourth maximum blind detection parameters satisfy at least one of the following (1) to (5):

(1) A fourth blind detection upper limit in the third maximum blind detection parameters is equal to 0, where the fourth blind detection upper limit is the maximum blind detection quantity of the control elements of the second cell. That is, the maximum blind detection quantity P' of the control elements of the second cell in the third maximum blind detection parameters is 0.

Since the second cell cannot schedule any cells, the maximum blind detection quantity of the control elements of the second cell in the third maximum blind detection parameters is set to 0 to avoid waste of the maximum blind detection capability of the terminal.

(2) A third blind detection upper limit in the third maximum blind detection parameters is greater than a fourth blind detection upper limit in the fourth maximum blind detection parameters, where the third blind detection upper limit is a maximum blind detection quantity of the control elements of the first cell. That is, the maximum blind detection quantity S' of the control elements of the first cell in the third maximum blind detection parameters is greater than the maximum blind detection quantity S of the control elements of the first cell in the fourth maximum blind detection parameters.

In this possible implementation, since the blind detection of the control elements of the first cell that schedule the second cell is counted into the blind detection share of the control elements of the first cell, the maximum blind detection quantity of the control elements of the first cell needs to be increased.

(3) A fifth blind detection upper limit in the third maximum blind detection parameters is greater than a fifth blind detection upper limit in the fourth maximum blind detection parameters, where the fifth blind detection upper limit is a maximum blind detection quantity of self-scheduling control elements of the first cell. That is, the maximum blind detection quantity S-self of self-scheduling control elements of the first cell in the third maximum blind detection parameters is greater than the maximum blind detection quantity S-self of self-scheduling control elements of the first cell in the fourth maximum blind detection parameters.

Since the second cell cannot schedule any cell, the blind detection budget corresponding to the second cell can be reallocated to the self-scheduling of the first cell. Therefore, if the scheduling configuration is the first scheduling configuration, the maximum blind detection quantity of self-scheduling control elements of the first cell in the third maximum blind detection parameters corresponding to the first scheduling configuration may be set to be greater than the maximum blind detection quantity of self-scheduling control elements of the first cell in the fourth maximum blind detection parameters.

(4) A first blind detection upper limit in the third maximum blind detection parameters is greater than a sixth blind detection upper limit in the fourth maximum blind detection parameters, where the first blind detection upper limit is a maximum blind detection quantity of control elements of the first cell that schedule the second cell. That is, the maximum blind detection quantity CR' of control elements of the first cell that schedule the second cell in the third maximum blind detection parameters is greater than the maximum blind detection quantity CR of control elements of the first cell that schedule the second cell in the fourth maximum blind detection parameters.

Since the second cell cannot schedule any cell, the blind detection budget corresponding to the second cell can be reallocated to the self-scheduling of the first cell. Therefore, if the scheduling configuration is the first scheduling configuration, the maximum blind detection quantity of control elements of the first cell that schedule the second cell in the third maximum blind detection parameters corresponding to the first scheduling configuration may be set to be greater than the maximum blind detection quantity of self-scheduling control elements of the first cell that schedule the second cell in the fourth maximum blind detection parameters.

(5) A sixth blind detection upper limit in the third maximum blind detection parameters is greater than a sixth blind detection upper limit in the fourth maximum blind detection parameters, where the sixth blind detection upper limit is a maximum blind detection quantity of control elements of the first cell that schedule the first cell and a third cell. That is, the maximum blind detection quantity S-selfandother' of control elements of the first cell that schedule the first cell and the third cell in the fourth maximum blind detection parameters is greater than the maximum blind detection quantity S-selfandother of control elements of the first cell that schedule the first cell and the third cell in the fourth maximum blind detection parameters.

Since the second cell cannot schedule any cell, the blind detection budget corresponding to the second cell can be reallocated to the self-scheduling of the first cell. Therefore, if the scheduling configuration is the first scheduling configuration, the maximum blind detection quantity of control elements of the first cell that schedule the first cell and the third cell in the third maximum blind detection parameters corresponding to the first scheduling configuration may be set to be greater than the maximum blind detection quantity of self-scheduling control elements of the first cell that schedule the first cell and the third cell in the fourth maximum blind detection parameters.

In the foregoing optional implementation, the fourth maximum blind detection parameters may be maximum blind detection parameters used when the second cell can be self-scheduled, the second cell can be self-scheduled and schedule other cells, and the first cell schedules the second cell, which is not specifically limited in this embodiment of this application.

In still another possible implementation, the blind detection of the control elements of the first cell that schedule the second cell may be alternatively counted into the joint blind detection share of the first cell and the second cell, that is, CR is taken as a part of T.

Therefore, in the foregoing possible implementation, the determining the target blind detection budget in S210 may include any one of the following (1) to (3).
(1) determining, if the scheduling configuration is the first scheduling configuration, that a first blind detection upper limit is equal to a joint maximum blind detection quantity of the control elements of the first cell and the second cell, where the first blind detection upper limit is a maximum blind detection quantity of control elements of the first cell that schedule the second cell;
(2) determining, if the scheduling configuration is the first scheduling configuration, that a seventh blind detection upper limit is equal to the joint maximum blind detection quantity of the control elements of the first cell and the second cell, where the seventh blind detection upper limit is a maximum blind detection quantity of control elements of the first cell that schedule the first cell and the second cell; or
(3) determining, if the scheduling configuration is the first scheduling configuration, that an eighth blind detection upper limit is equal to the joint maximum blind detection quantity of the control elements of the first cell and the second cell, where the eighth blind detection upper limit is a maximum blind detection quantity of control elements of the first cell that schedule the second cell, the first cell, and a third cell.

Alternatively, in the foregoing possible implementation, the determining the target blind detection budget in S210 may include: determining the target blind detection budget by using fifth maximum blind detection parameters corresponding to the first scheduling configuration if the scheduling configuration is the first scheduling configuration. In this possible implementation, a plurality of sets of maximum blind detection parameters may be configured for each terminal, and the target blind detection budget of the terminal is determined by using fifth maximum blind detection parameters corresponding to the first scheduling configuration if the scheduling configuration is the first scheduling configuration.

In the foregoing possible implementation, optionally, the terminal may be further provided with sixth maximum blind detection parameters, and in this case, the third maximum blind detection parameters and the fourth maximum blind detection parameters satisfy at least one of the following (1) to (2):
(1) A first blind detection upper limit in the fifth maximum blind detection parameters is greater than a first blind detection upper limit in the sixth maximum blind detection parameters, where the first blind detection upper limit is a maximum blind detection quantity of control elements of the first cell that schedule the second cell. That is, the maximum blind detection quantity $CR'$ of control elements of the first cell that schedule the second cell in the fifth maximum blind detection parameters is greater than the maximum blind detection quantity $CR$ of control elements of the first cell that schedule the second cell in the sixth maximum blind detection parameters.

Since the second cell cannot schedule any cell, the blind detection budget corresponding to the second cell can be reallocated to the self-scheduling of the first cell. Therefore, if the scheduling configuration is the first scheduling configuration, the maximum blind detection quantity of control elements of the first cell that schedule the second cell in the fifth maximum blind detection parameters corresponding to the first scheduling configuration may be set to be greater than the maximum blind detection quantity of self-scheduling control elements of the first cell that schedule the second cell in the sixth maximum blind detection parameters.
(2) A ninth blind detection upper limit in the fifth maximum blind detection parameters is greater than or less than a ninth blind detection upper limit in the sixth maximum blind detection parameters, where the ninth blind detection upper limit is a joint maximum blind detection quantity of the control elements of the first cell and the second cell. That is, the joint maximum blind detection quantity $T'$ of the control elements of the first cell and the second cell in the fifth maximum blind detection parameters is greater than the joint maximum blind detection quantity $T$ of the control elements of the first cell and the second cell in the sixth maximum blind detection parameters.

Since the second cell cannot schedule any cell, the blind detection budget corresponding to the second cell can be reallocated to the self-scheduling of the first cell. Therefore, if the scheduling configuration is the first scheduling configuration, the joint maximum blind detection quantity of the control elements of the first cell and the second cell in the fifth maximum blind detection parameters corresponding to the first scheduling configuration may be set to be greater than the joint maximum blind detection quantity of the control elements of the first cell and the second cell in the sixth maximum blind detection parameters. Alternatively, since the second cell cannot schedule any cell, a possible situation is that data to be scheduled is reduced. Therefore, to effectively allocate the maximum blind detection capability of the terminal, the joint maximum blind detection quantity of the control elements of the first cell and the second cell may be reduced.

In the foregoing optional implementation, the sixth maximum blind detection parameters may be maximum blind detection parameters used when the second cell can be self-scheduled, the second cell can be self-scheduled and schedule other cells, and the first cell schedules the second cell, which is not specifically limited in this embodiment of this application.

In the possible implementations, the determined target blind detection budget may be a blind detection budget of the terminal at any of the following times (1) to (8):
(1) Within a first predetermined time or after a second predetermined time when it is determined that the scheduling configuration is the first scheduling configuration.

For example, within a first predetermined time or after a second predetermined time when the second cell or the second cell group is indicated as dormant (dormant) through the first control information.
(2) Before second control information is transmitted, where the second control information indicates that the second cell or a second cell group is non-dormant, and the second cell group is a cell group in which the second cell is located.

Similar to the first control information, the second control information may be DCI, or may be control information indicated by MAC CE or RRC, which is not specifically limited in this embodiment.

That is, in this possible implementation, if it is determined that the scheduling configuration is the first scheduling configuration, unless the second control information is transmitted, the foregoing target blind detection budget is used for information transmission.
(3) Before the second cell is activated.

That is, in this possible implementation, if it is determined that the scheduling configuration is the first scheduling configuration, unless the second cell is activated, the foregoing target blind detection budget is used for information transmission.

(4) Before the second cell is reconfigured.

That is, in this possible implementation, if it is determined that the scheduling configuration is the first scheduling configuration, unless the second cell is reconfigured, the foregoing target blind detection budget is used for information transmission. After the second cell is reconfigured, the corresponding scheduling configuration may be determined according to the status of the reconfigured second cell.

(5) Before a first timer of the second cell is started.

That is, in this possible implementation, if it is determined that the scheduling configuration is the first scheduling configuration, unless the first timer of the second cell is started, the foregoing target blind detection budget is used for information transmission.

The first timer may be a cell inactive timer (cell inactive Timer). Optionally, after the first timer is started, the countdown for deactivation of the second cell starts, and after the first timer expires, the second cell is deactivated.

(6) Before a first target BWP of the second cell is activated, where the first target BWP is a BWP that supports scheduling of the second cell.

That is, in this possible implementation, if it is determined that the scheduling configuration is the first scheduling configuration, unless the first target BWP of the second cell is activated, the foregoing target blind detection budget is used for information transmission.

(7) Before the first target BWP of the second cell is reconfigured.

That is, in this possible implementation, if it is determined that the scheduling configuration is the first scheduling configuration, unless the first target BWP of the second cell is reconfigured, the foregoing target blind detection budget is used for information transmission.

(8) Before a second timer of the first target BWP of the second cell is started.

That is, in this possible implementation, if it is determined that the scheduling configuration is the first scheduling configuration, unless the second timer of the first target BWP of the second cell is started, the foregoing target blind detection budget is used for information transmission.

The second timer may be a BWP inactive timer (BWP inactive Timer). Optionally, after the second timer is started, the countdown for deactivation of the first target BWP of the second cell starts, and after the first timer expires, the first target BWP of the second cell is deactivated.

In a possible implementation, the target mapping manner determined in the following (2) may also be applicable to the foregoing times, and may not only be applicable to the foregoing times, which is not specifically limited in this embodiment.

(2) Determination of the Target Mapping Manner

In a possible implementation, when the scheduling configuration is the first scheduling configuration, blind detection of the control elements of the first cell that schedule the second cell (that is, SSs of the first cell that schedule the second cell) may be counted into the blind detection share of the second cell, that is, CR is taken as a part of P.

Therefore, in the foregoing possible implementation, the determining a target mapping manner according to a scheduling configuration of a first cell and/or a second cell in S210 may include: if the scheduling configuration is the first scheduling configuration, when mapping of the control elements of the second cell is performed in a scheduling time unit, mapping non-self-scheduling control elements of the second cell on the physical control resources of the second cell, and/or mapping control elements of the first cell that schedule the second cell on the physical control resources of the first cell.

That is, when mapping of the control elements of the second cell is performed in a scheduling time unit, non-self-scheduling control elements of the second cell are mapped.

For example, self-scheduling search spaces of the second cell are SS #0/1/2/3/5, a search space of the first cell that schedules the second cell is SS #4, and search spaces of the second cell that schedule the third cell are SS #5/6. If it indicates on the second cell or the first cell that the second cell or the cell group (cell group) where the second cell is located is dormant, or the second cell is deactivated, or the BWP (that supports scheduling of the second cell) of the second cell is switched, or the BWP (that supports scheduling of the second cell) of the second cell is deactivated, according to the foregoing mapping sequence, SS #4 is first mapped on the physical control resources of the first cell, and SS #5/6 are then mapped on the physical control resources of the second cell.

In the foregoing possible implementation, in a scheduling time unit, a total quantity of mapped control elements does not exceed a maximum blind detection quantity of the second cell. That is, a total quantity of control elements mapped on the physical control resources of the first cell and/or the physical control resources of the second cell does not exceed the maximum blind detection quantity of the second cell. That is, in a scheduling time unit, the mapping is performed to a quantity of control elements that does not exceed and is closest to the maximum blind detection quantity of the second cell. If there are still unmapped control elements, the mapping is not continued.

The maximum blind detection quantity of the second cell may be determined according to the foregoing target blind detection budget. This is not specifically limited in this application.

In another possible implementation, when the scheduling configuration is the first scheduling configuration, blind detection of the control elements of the first cell that schedule the second cell (that is, SSs of the first cell that schedule the second cell) may be counted into the blind detection share of the first cell, that is, CR is taken as a part of S.

Therefore, in the foregoing possible implementation, in a scheduling time unit, a total quantity of control elements mapped on the physical control resources of the first cell and/or the physical control resources of the second cell does not exceed the maximum blind detection quantity of the first cell. That is, in a scheduling time unit, the mapping is performed to a quantity of control elements that does not exceed and is closest to the maximum blind detection quantity of the first cell. If there are still unmapped control elements, the mapping is not continued.

For example, a self-scheduling search space of the first cell is SS #6, and a search space of the first cell that schedules the second cell is SS #5. If it indicates on the second cell or the first cell that the second cell or the cell group where the second cell is located is dormant, or the second cell is deactivated, or the BWP (that supports scheduling of the second cell) of the second cell is switched, or the BWP (that supports scheduling of the second cell) of the second cell is deactivated, SS #5 is first mapped and SS #6 is then mapped when search spaces are mapped on the physical control resources of the first cell.

In still another possible implementation, the blind detection of the control elements of the first cell that schedule the second cell may be alternatively counted into the joint blind detection share of the first cell and the second cell, that is, CR is taken as a part of T.

Therefore, in this possible implementation, the determining a target mapping manner according to a scheduling configuration of a first cell and/or a second cell in S210 may include: if the scheduling configuration is the first scheduling configuration, when mapping of the control elements of the second cell and/or the control elements of the first cell is performed in a scheduling time unit, mapping self-scheduling control elements of the first cell on the physical control resources of the first cell; and/or mapping control elements of the first cell that schedule the second cell on the physical control resources of the first cell.

In the foregoing possible implementation, the first cell scheduling the second cell belongs to the joint budget of the control elements of the first cell and the second cell, and the second cell at least cannot be self-scheduled. Therefore, in a scheduling time unit, when mapping of scheduling the second cell and/or mapping of the control elements of the second cell is performed, the self-scheduling control elements of the first cell and/or the control elements of the first cell that schedule the second cell are mapped.

In the foregoing possible implementation, since the first cell scheduling the second cell belongs to the joint budget of the control elements of the first cell and the second cell, in a scheduling time unit, a total quantity of mapped control elements does not exceed the joint maximum blind detection quantity of the control elements of the first cell and the second cell.

2. The Scheduling Configuration is the Second Scheduling Configuration or the Third Scheduling Configuration In a possible implementation, when the scheduling configuration is the second scheduling configuration or the third scheduling configuration, and a first condition is satisfied, it is determined that the first cell does not support scheduling of the second cell, or the first cell does not support scheduling of any cell.

In the foregoing possible implementations of the embodiments of this application, the first condition includes, but is not limited to, at least one of the following (1) to (4).

(1) Third control information is transmitted, where the third control information indicates that the first cell or a first cell group is dormant, and the first cell group is a cell group in which the first cell is located.

For example, the third control information may be control information of the first cell, that is, dormancy indication (dormancy indication) indicated by the control information of the first cell indicates that the first cell or the first cell group is dormant; and/or, the third control information may be alternatively control information of the second cell, that is, dormancy indication (dormancy indication) indicated by the control information of the second cell indicates that the first cell or the first cell group is dormant.

The third control information includes, but is not limited to: DCI, control information transmitted through MAC CE, or control information configured by RRC signaling.

In this embodiment of this application, the first cell can schedule the second cell. In this case, it can be agreed through a protocol or configured on the network side: a) only (can) support the dormancy indication through the control information of the first cell; b) only (can) support the dormancy indication through the control information of the second cell; and c) (can) support both the dormancy indication of the control information of the second cell and the dormancy indication of the control information of the first cell. The communication device may agree through a protocol or configure on the network side, a cell for transmitting the third control information.

(2) The first cell is deactivated.

For example, an inactive timer of the first cell is not configured, or the inactive timer of the first cell expires, or the deactivation of the first cell is indicated through MAC CE, RRC, or DCI.

(3) A BWP of the first cell is switched to a BWP that does not support scheduling of the second cell.

For example, the BWP of the first cell that supports scheduling of the second cell is switched to the BWP that does not support scheduling of the second cell.

(4) The BWP of the first cell is deactivated.

For example, the first cell is not provided with a BWP inactive timer (inactive Timer) or the inactive Timer of the BWP of the first cell expires.

When any one of the foregoing first conditions is satisfied, it can be considered that the first cell cannot schedule the second cell, but can be self-scheduled and schedule other cells, or it can be considered that the first cell cannot schedule any cell. When (1) or (2) above is satisfied, the first cell is in a dormant or deactivated state, and the terminal cannot monitor network-side control information on the first cell, nor can it schedule a control element on the first cell. Therefore, the communication device considers that the first cell cannot schedule any cell. When (3) or (4) above is satisfied, the BWP of the first cell cannot schedule the BWP of the second cell, but can monitor the network-side control information on the first cell. Therefore, the first cell cannot schedule the second cell, but can be self-scheduled and schedule other cells.

Therefore, a part of a blind detection quantity corresponding to the first cell may not be used, and it may be considered to reallocate this part of the blind detection capability of the terminal. For example, if the first cell cannot schedule the second cell, the maximum blind detection quantity of control elements of the first cell that schedule the second cell may be reduced; and if the first cell cannot schedule any cell, the maximum blind detection quantity of the control elements of the first cell may be reduced, and the reduced blind detection quantity may be allocated to the second cell. Therefore, it is necessary to reallocate the blind detection budget of the terminal and/or adjust the mapping manner. The following describes the determination of the target blind detection budget and the target mapping manner of the terminal respectively in this case.

(1) Target Blind Detection

In a possible implementation, when it is determined that the first cell cannot schedule the second cell, or it is determined that the first cell cannot schedule any cell, the control elements of the first cell that schedule the second cell may be used as the blind detection budget of the second cell.

Therefore, in the foregoing possible implementation, the determining a target blind detection budget according to a scheduling configuration of a first cell and/or a second cell in S210 may include: determining that a first blind detection upper limit is equal to 0, where the first blind detection upper limit is a maximum blind detection quantity of control elements of the first cell that schedule the second cell; and/or determining that a second blind detection upper limit is equal to a maximum blind detection quantity of the control elements of the second cell, where the second blind detection upper limit is a maximum blind detection quantity of self-scheduling control elements of the second cell.

In the foregoing possible implementation, the first cell cannot schedule the second cell, that is, a quantity of control elements of the first cell that schedule the second cell is 0. Therefore, a sixth maximum blind detection quantity in the target blind detection budget of the terminal (that is, the maximum blind detection quantity of the control elements of the first cell that schedule the second cell) may be set to 0. In addition, the control elements of the first cell that schedule the second cell are used as the blind detection budget of the second cell, and the quantity of control elements of the first cell that schedule the second cell is 0. Therefore, a seventh maximum blind detection quantity in the target blind detection budget (that is, the maximum blind detection quantity of self-scheduling control elements of the second cell) may be set to the maximum blind detection quantity of the control elements of the first cell, to make full use of physical resources.

In the foregoing possible implementation, optionally, In the case that the control elements of the first cell that schedule the second cell are used as the blind detection budget of the second cell, the determining a target blind detection budget according to a scheduling configuration of a first cell and/or a second cell may include: determining the target blind detection budget by using seventh maximum blind detection parameters. That is, the seventh maximum blind detection parameters are used as the target blind detection budget of the terminal. In this optional implementation, a plurality of sets of maximum blind detection parameters may be configured for the terminal, and the seventh maximum blind detection parameters correspond to a target state of the terminal, where the target state is that the scheduling configuration is the second scheduling configuration or the third scheduling configuration, and the first condition is satisfied.

In the foregoing optional implementation, eighth maximum blind detection parameters are further configured, and the seventh maximum blind detection parameters and the eighth maximum blind detection parameters satisfy at least one of the following (1) or (2):

(1) A second blind detection upper limit in the seventh maximum blind detection parameters is greater than a second blind detection upper limit in the eighth maximum blind detection parameters, where the second blind detection upper limit is a maximum blind detection quantity of self-scheduling control elements of the second cell. That is, the maximum blind detection quantity P-self of self-scheduling control elements of the second cell in the seventh maximum blind detection parameters is greater than the maximum blind detection quantity P-self of self-scheduling control elements of the second cell in the eighth maximum blind detection parameters.

The control elements of the first cell that schedule the second cell are used as the blind detection budget of the second cell, and the quantity of control elements of the first cell that schedule the second cell is 0. Therefore, a portion of the blind detection budget of the control elements of the first cell may be reallocated to the self-scheduling control elements of the second cell. Therefore, in this implementation, the maximum blind detection quantity of self-scheduling control elements of the second cell in the seventh maximum blind detection parameters may be greater than the maximum blind detection quantity of self-scheduling control elements of the second cell in the eighth maximum blind detection parameters.

(2) A fourth blind detection upper limit in the seventh maximum blind detection parameters is greater than a fourth blind detection upper limit in the eighth maximum blind detection parameters, where the fourth blind detection upper limit is a maximum blind detection quantity of the control elements of the second cell. That is, the maximum blind detection quantity P' of the control elements of the second cell in the seventh maximum blind detection parameters is greater than the maximum blind detection quantity P of the control elements of the second cell in the eighth maximum blind detection parameters.

The control elements of the first cell that schedule the second cell are used as the blind detection budget of the second cell, and the quantity of control elements of the first cell that schedule the second cell is 0. Therefore, a portion of the blind detection budget of the control elements of the first cell may be reallocated to the control elements of the second cell. Therefore, in this implementation, the maximum blind detection quantity of control elements of the second cell in the seventh maximum blind detection parameters may be greater than the maximum blind detection quantity of control elements of the second cell in the eighth maximum blind detection parameters.

In the foregoing possible implementation, the eighth maximum blind detection parameters may be the target blind detection budget of the terminal under normal conditions. For example, the first cell can schedule the second cell, and the second cell can be self-scheduled.

In the foregoing possible implementation, since the first cell cannot schedule the second cell in this case, the second cell can only perform self-scheduling through the control information of the second cell. Therefore, the maximum blind detection quantity of the self-scheduling control elements of the second cell may be adjusted. For example, the maximum blind detection quantity of the self-scheduling control elements of the second cell may be the maximum blind detection quantity of the control elements of the second cell. That is, more self-scheduling of the second cell is allowed to make full use of the idle blind detection quantity.

Optionally, the second cell self-scheduling (or the self-scheduling control elements of the second cell) may include the CSS of the terminal, for example, group common PDCCH.

In another possible implementation, when the scheduling configuration is the second scheduling configuration or the third scheduling configuration, and a first condition is satisfied, the first cell scheduling the second cell may be considered as the budget of the first cell.

Therefore, in the foregoing possible implementation, the determining a target blind detection budget according to a scheduling configuration of a first cell and/or a second cell includes at least one of the following:

determining that a first blind detection upper limit is equal to 0, where the first blind detection upper limit is a maximum blind detection quantity of control elements of the first cell that schedule the second cell;

determining that a fifth blind detection upper limit is equal to a maximum blind detection quantity of the control elements of the first cell, where the fifth blind detection upper limit is a maximum blind detection quantity of self-scheduling control elements of the first cell;

determining that a sixth blind detection upper limit is equal to the maximum blind detection quantity of the control elements of the first cell, where the sixth blind detection upper limit is a maximum blind detection quantity of control elements of the first cell that schedule the first cell and a third cell; or determining that a third blind detection upper limit is equal to 0, where the third blind detection upper limit is the maximum blind detection quantity of the control elements of the first cell.

In the foregoing possible implementation, since the first cell cannot schedule the second cell, the first cell can only schedule cells other than the second cell (for example, the first cell). Therefore, the maximum blind detection quantity of the self-scheduling control elements of the first cell may be adjusted. For example, the maximum blind detection quantity of the self-scheduling control elements of the first cell may be configured as the maximum blind detection quantity supported by the first cell. That is, more self-scheduling of the first cell is allowed to make full use of the idle blind detection quantity.

In the foregoing possible implementation, the items may be combined with each other. For example, the first blind detection upper limit may be set to 0, and the fifth blind detection upper limit may be set to the maximum blind detection quantity of the control elements of the first cell. That is, the blind detection budget of the control elements of the first cell is used as the blind detection budget of the self-scheduling of the first cell.

Alternatively, the first blind detection upper limit may be alternatively set to 0, and the sixth blind detection upper limit may be set to the maximum blind detection quantity of the control elements of the first cell. That is, the blind detection budget of the control elements of the first cell is used as the blind detection budget of the first cell scheduling the first cell and the third cell. Since the first cell cannot schedule the second cell, the first cell can only schedule cells other than the second cell (for example, the first cell and/or the third cell, that is, other cells). Therefore, in the case of CA limited, a quantity of cells scheduled by the first cell changes. Therefore, the maximum blind detection quantity of S-selfandother may be adjusted, for example, to the maximum blind detection quantity of the first cell, that is, more scheduling of the first cell and the third cell is allowed.

Alternatively, in the case that the first cell cannot schedule any cell, when it indicates that the first cell is dormant or the first cell is deactivated or the BWP of the first cell (which can schedule the second cell) is switched or the BWP of the first cell (which can schedule the second cell) is deactivated, the first cell cannot schedule any cell, and the maximum blind detection quantity of the control elements of the first cell may also be directly set to 0.

In the foregoing implementation, if scheduling of the second cell by the first cell belongs to the blind detection budget of the first cell, the determining a target blind detection budget according to a scheduling configuration of a first cell and/or a second cell may further include: determining the target blind detection budget by using ninth maximum blind detection parameters. That is, the ninth maximum blind detection parameters are used as the target blind detection budget of the terminal. In this optional implementation, a plurality of sets of maximum blind detection parameters may be configured for the terminal, and the ninth maximum blind detection parameters correspond to a target state of the terminal, where the target state is that the scheduling configuration is the second scheduling configuration or the third scheduling configuration, and the first condition is satisfied.

Optionally, the terminal may be further provided with tenth maximum blind detection parameters, and the ninth maximum blind detection parameters and the tenth maximum blind detection parameters satisfy at least one of the following:

a fifth blind detection upper limit in the ninth maximum blind detection parameters is greater than a fifth blind detection upper limit in the tenth maximum blind detection parameters, where the fifth blind detection upper limit is a maximum blind detection quantity of self-scheduling control elements of the first cell, that is, the maximum blind detection quantity S-self of self-scheduling control elements of the first cell in the ninth maximum blind detection parameters is greater than the maximum blind detection quantity S-self of self-scheduling control elements of the first cell in the tenth maximum blind detection parameters; or a sixth blind detection upper limit in the ninth maximum blind detection parameters is greater than a sixth blind detection upper limit in the tenth maximum blind detection parameters, where the sixth blind detection upper limit is a maximum blind detection quantity of control elements of the first cell that schedule the first cell and a third cell. That is, the maximum blind detection quantity S-selfandother' of control elements of the first cell that schedule the first cell and the third cell in the ninth maximum blind detection parameters is greater than the maximum blind detection quantity S-selfandother of control elements of the first cell that schedule the first cell and the third cell in the tenth maximum blind detection parameters.

In the foregoing possible implementation, the tenth maximum blind detection parameters may be the target blind detection budget of the terminal under normal conditions. For example, the first cell can schedule the second cell, and the second cell can be self-scheduled.

In another possible implementation, the first cell scheduling the second cell may alternatively belong to the joint blind detection budget of the control elements of the first cell and the second cell.

In the foregoing possible implementation, the determining a target blind detection budget according to a scheduling configuration of a first cell and/or a second cell may include: determining that a tenth blind detection upper limit is equal to a joint maximum blind detection quantity of the control elements of the first cell and the second cell, where the tenth blind detection upper limit is a maximum blind detection quantity of control elements of the first cell that do not schedule the second cell. The first cell cannot schedule the second cell. Therefore, in this possible implementation, the maximum blind detection quantity of control elements of the first cell that do not schedule the second cell is set to the joint maximum blind detection quantity of the control elements of the first cell and the second cell, to make full use of the idle blind detection quantity.

In the possible implementations, the determined target blind detection budget may be a blind detection budget of the terminal at any of the following times (1) to (8):

(1) within a third predetermined time or after a fourth predetermined time when it is determined that the first cell does not support scheduling of the second cell or the first cell does not support scheduling of any cell;

(2) before fourth control information is transmitted, where the fourth control information indicates that the first cell or the first cell group is non-dormant, where similar to the first control information, the second control information, and the third control information, the fourth control information may be DCI on the first cell and/or the second cell, or control information indicated by MAC CE, or control information configured by RRC signaling, which is not specifically limited in this application;

(3) before the first cell is activated;
(4) before the first cell is reconfigured;
(5) before a third timer of the first cell is started, where the third timer may be a cell inactive timer (cell inactive timer), and optionally, after the third timer is started, the countdown for deactivation of the first cell starts, and after the third timer expires, the first cell is deactivated;
- (6) before a second target BWP of the first cell is activated, where the second target BWP is a BWP that supports scheduling of the second cell;
- (7) before the second target BWP of the first cell is reconfigured; or
- (8) before a fourth timer of the second target BWP of the first cell is started.

The fourth timer may be a BWP inactive timer (BWP inactive timer) of the second target BWP. Optionally, after the fourth timer is started, the countdown for deactivation of the second target BWP of the first cell starts, and after the fourth timer expires, the second target BWP of the first cell is deactivated.

Through the foregoing possible implementation, after the first cell is switched to an inactive or non-sleep state, or switched to the BWP of the first cell that supports scheduling of the second cell, the target blind detection budget of the terminal may be re-determined, to realize the adjustment of target blind detection budget.

In a possible implementation, the target mapping manner determined in the following (2) may also be applicable to the foregoing times, and may not only be applicable to the foregoing times, which is not specifically limited in this embodiment.

(2) Determination of the Target Mapping Manner

In this embodiment of this application, after the terminal configures or switches to the second scheduling configuration or the third scheduling configuration, if at least one of the foregoing first conditions is satisfied, the mapping manner of the terminal may be adjusted.

In a possible implementation, if scheduling of the second cell by the first cell is considered as the blind detection budget of the second cell, the determining a target mapping manner according to a scheduling configuration of a first cell and/or a second cell in S210 may include: if the scheduling configuration is the second scheduling configuration or the third scheduling configuration and the first condition is satisfied, when mapping of the control elements of the second cell is performed in a scheduling time unit, mapping self-scheduling control elements of the second cell on the physical control resources of the second cell.

That is, when mapping of the control elements of the second cell is performed in a scheduling time unit, self-scheduling control elements of the second cell are mapped on the physical control resources of the second cell.

For example, self-scheduling search spaces of the second cell are SS #0/1/2/3/5/6, and a search space of the first cell that schedules the second cell is SS #4. If it indicates on the second cell or the first cell that the first cell or the Scell group where the first cell is located is dormant, or the first cell is deactivated, or the BWP (that supports scheduling of the second cell) of the first cell is switched, or the BWP (that supports scheduling of the second cell) of the first cell is deactivated, SS #0/1/2/3 are first mapped and SS #5/6 are then mapped according to the foregoing mapping sequence when search spaces are mapped on the physical control resources of the second cell.

In the foregoing possible implementation, in a scheduling time unit, a total quantity of mapped control elements does not exceed a maximum blind detection quantity of the control elements of the second cell. That is, a total quantity of control elements mapped on the physical control resources of the second cell does not exceed a maximum blind detection quantity of the control elements of the second cell. That is, the mapping is performed to a quantity of search spaces that does not exceed and is closest to the maximum blind detection quantity P of the control elements of the second cell. If there are still unmapped search spaces, the mapping is not continued.

The maximum blind detection quantity of the control elements of the second cell may be the maximum blind detection quantity of the control elements of the second cell in the target blind detection budget determined in each implementation in (1) above, or may be determined in other manners, which is not specifically limited in this application.

In another possible implementation, blind detection of the control elements of the first cell that schedule the second cell (that is, SSs of the first cell that schedule the second cell) may be counted into the blind detection share of the first cell, that is, scheduling of the second cell by the first cell belongs to the blind detection budget of the first cell.

In the foregoing possible implementation, the determining a target mapping manner according to a scheduling configuration of a first cell and/or a second cell in S210 may include: if the scheduling configuration is the second scheduling configuration or the third scheduling configuration and the first condition is satisfied, when mapping of the control elements of the first cell is performed in a scheduling time unit: mapping self-scheduling control elements of the first cell on the physical control resources of the first cell; and/or mapping control elements of the first cell that schedule the third cell on the physical control resources of the first cell. In this possible implementation, when mapping of the control elements of the first cell is performed in a scheduling time unit, self-scheduling control elements of the first cell are mapped.

For example, a self-scheduling search space of the first cell is SS #4/6, and a search space of the first cell that schedules the second cell is SS #5. If any one of the foregoing first conditions is satisfied, SS #4 is first mapped and SS #6 is then mapped according to the foregoing mapping sequence when search spaces are mapped on the physical control resources of the first cell.

In the foregoing possible implementation, optionally, in a scheduling time unit, a total quantity of mapped control elements does not exceed a maximum blind detection quantity of the control elements of the first cell. For example, a total quantity of control elements mapped on the physical control resources of the first cell does not exceed a maximum blind detection quantity of the control elements of the first cell.

Optionally, in the foregoing possible implementation, self-scheduling control elements of the first cell may be mapped on the physical control resources of the first cell. Optionally, a quantity of the mapped self-scheduling control elements of the first cell cannot exceed the maximum blind detection quantity of the control elements of the first cell.

Optionally, in the foregoing possible implementation, self-scheduling control elements of the first cell are mapped on the physical control resources of the first cell; and/or control elements of the first cell that schedule the third cell are mapped on the physical control resources of the first cell. One of the mapping sequences is: the self-scheduling control elements of the first cell are mapped first, and if the quantity of the mapped self-scheduling control elements of the first cell does not exceed the maximum blind detection quantity of the control elements of the first cell, the control elements of the first cell that schedule the third cell may be then mapped on the physical control resources of the first cell.

That is, the mapping is performed to a quantity of search spaces that does not exceed and is closest to the maximum blind detection quantity S of the control elements of the first cell. If there are still unmapped search spaces, the mapping is not continued.

In still another possible implementation, the blind detection of the control elements of the first cell that schedule the second cell may be alternatively counted into the joint blind detection share of the first cell and the second cell, and the blind detection budget of the scheduling of the second cell by the first cell belongs to the joint blind detection budget of the first cell and the second cell.

Therefore, in this possible implementation, the determining a target mapping manner according to a scheduling configuration of a first cell and/or a second cell in S210 may include: if the scheduling configuration is the second scheduling configuration or the third scheduling configuration and the first condition is satisfied, when mapping of the control elements of the first cell and/or the second cell is performed in a scheduling time unit: mapping self-scheduling control elements of the second cell on the physical control resources of the second cell; and/or mapping self-scheduling control elements of the first cell on the physical control resources of the first cell. That is, in this possible implementation, when mapping of the control elements of the first cell and/or the second cell is performed in a scheduling time unit, self-scheduling control elements of the first cell and/or the second cell are mapped.

In the foregoing possible implementation, optionally, in a scheduling time unit, a total quantity does not exceed the joint maximum blind detection quantity of the control elements of the first cell and the second cell.

It should be noted that, in the technical solutions provided in the embodiments of this application, when the control elements of the first cell are mapped, in addition to the self-scheduling control elements of the first cell and the control elements of the first cell that schedule the second cell, there may be control elements of the first cell that schedule other cells. In this application, the mapping of the control elements of the first cell that schedule other cells is not described. This is because this application mainly describes whether the self-scheduling control elements of the first cell and the control elements of the first cell that schedule the second cell need to be mapped on the first cell, and whether there are control elements of the first cell that schedule other cells is not limited in this application.

The technical solutions provided in the embodiments of this application are described by taking the first cell being an Scell #1, the second cell being a Pcell, and the communication device being a terminal as an example.

In the following embodiment, when the Scell #1 schedules the Pcell, search spaces involved include but are not limited to:
1) a self-scheduling SS on the Pcell, denoted as P-Self-SS, where the SS may be a CSS or a USS, or may include both;
2) an SS of the Scell #1 that schedules the Pcell, denoted as SP-CR-SS; and
3) another SS of the Scell #1, denoted as O-SS, where the SS includes an O-self-SS for self-scheduling of Scell #1, and/or an O-otherS-SS for scheduling other Scells, the O-self-SS and the O-otherS-SS may be the same SS or different, and there may be a CSS or only a USS in the O-SS.

In the following embodiment, when the Scell #1 schedules the Pcell, a blind detection budget may include, but is not limited to, at least one of the following (that is, the blind detection budget may include at least one of the following):
a) a maximum blind detection quantity P of the control elements (including but not limited to a PDCCH, a CCE, or an SS) of the Pcell;
b) a maximum blind detection quantity P-self of self-scheduling control elements (including but not limited to a PDCCH, a CCE, or an SS) of the Pcell;
c) a maximum blind detection quantity CR of the control elements (including but not limited to a PDCCH, a CCE, or an SS) of the Scell #1 that schedule the Pcell;
d) a maximum blind detection quantity S of the control elements (including but not limited to a PDCCH, a CCE, or an SS) of the Scell #1;
e) a maximum blind detection quantity S-self of self-scheduling control elements (including but not limited to a PDCCH, a CCE, or an SS) of the Scell #1;
f) a maximum blind detection quantity S-other of the control elements (including but not limited to a PDCCH, a CCE, or an SS) of the Scell #1 that schedule another Scell (that is, an Scell except the Scell #1, for example, Scell #2);
g) a maximum blind detection quantity S-selfandother of control elements (including but not limited to a PDCCH, a CCE, or an SS) of the Scell #1 that schedule the Scell #1 and another Scell; or
h) a joint maximum blind detection quantity T of the control elements (including but not limited to a PDCCH, a CCE, or an SS) of the Pcell and the Scell #1.

Whether the blind detection quantity of the control elements in the SP-CR-SS, or the control elements of the Scell #1 that schedule the Pcell in the SP-CR-SS is used as the budget of the Scell #1 or the Pcell may be divided into the following cases:
a) the blind detection of the control elements of the Scell #1 that schedule the Pcell in the SP-CR-SS is counted into the blind detection share of the Pcell, and it can be considered that CR is a part of P;
b) the blind detection of the control elements of the Scell #1 that schedule the Pcell in the SP-CR-SS is counted into the blind detection share of the scheduling cell (Scheduling cell, that is, the Scell #1), and it can be considered that CR is a part of S; and
c) the blind detection of the control elements of the Scell #1 that schedule the Pcell in the SP-CR-SS is counted into the joint blind detection share of the Pcell and the scheduling cell (that is, the Scell #1), and it can be considered that CR is a part of T.

Optionally, the foregoing manners a), b), or c) may be adopted through protocol specification, network side device configuration, or terminal selection, which is not specifically limited in this embodiment of this application.

In this embodiment of this application, there are three scheduling configurations, that is, the foregoing first scheduling configuration, second scheduling configuration, and third scheduling configuration. Alternatively, when the first cell is Scell #1 and the second cell is Pcell, the three scheduling configurations are respectively as follows:

The first scheduling configuration: The Pcell cannot be self-scheduled+the Scell #1 schedules the Pcell The second scheduling configuration: the control information in the Pcell CSS can schedule the Pcell+the Scell #1 schedules the Pcell (that is, activate and deactivate the CSS self-scheduling).

Optionally, in the second scheduling configuration, if the Scell #1 is deactivated, the control information (for example, PDCCH) in the Pcell CSS can self-schedule the Pcell, or the Pcell can only be scheduled by the control information in the Pcell CSS.

The third scheduling configuration: the control information in the Pcell CSS and the USS can schedule the Pcell+the Scell #1 schedules the Pcell (that is, activate and deactivate the USS self-scheduling).

Optionally, in the third scheduling configuration, if the Scell #1 is deactivated, the control information in the Pcell CSS and the USS can self-schedule the Pcell, or the Pcell can only be scheduled by the control information in the Pcell CSS and the USS.

(1) When the first cell is Scell #1, the second cell is Pcell, and the scheduling configuration is the first scheduling configuration, the blind detection budget can be determined in the following manner.

In a possible implementation, in at least one of the following cases, it is considered that the scheduling configuration is configured as or switched to the first scheduling configuration, that is, it is determined that the Pcell cannot self-schedule the Pcell (but can schedule other Scells), or the Pcell may not schedule any cell:

1) after the Pcell or the cell group where the Pcell is located is indicated to be dormant by MAC CE, RRC or DCI;
2) the Pcell is deactivated, for example, an inactive Timer of the Pcell is not configured or the inactive Timer of the Pcell expires, or the deactivation of the Pcell is indicated through MAC CE, RRC, or DCI;
3) the BWP (which can schedule the Pcell) of the Pcell is switched, for example, to a BWP that does not support scheduling of the Pcell; or
4) the BWP (which can schedule the Pcell) of the Pcell is deactivated. For example, the BWP of the Pcell is not provided with a BWP inactive Timer or the inactive Timer expires.

In a possible implementation, if the foregoing manner a) is used to determine the blind detection budget of scheduling of the Pcell by the Scell #1, when at least one of the cases described in 1) to 4) occurs, it is determined that within/after the next period of time, or before the control information indicating that the Pcell or the cell group where the Pcell is located is non-dormant, or after the Pcell is activated/reconfigured/timer started, or before the BWP (which can schedule the Pcell) of the Pcell is activated/reconfigured/timer started, the blind detection budget of the terminal may include at least one of the following:

1. CR=P, and/or, P-self=0
2. The base station configures new CR' and/or S', that is, the base station configures a set of blind detection budget parameters corresponding to the first scheduling configuration for the terminal, including CR' and/or S'.

Optionally, CR'>=CR, and/or, S'>=S, where CR and S are values in another set of blind detection budget parameters configured by the base station for the UE.

In a possible implementation, if the foregoing manner b) is used to determine the blind detection budget of scheduling of the Pcell by the Scell #1, when at least one of the cases described in 1) to 4) occurs, it is determined that within/after the next period of time, or before the control information indicating that the Pcell or the cell group where the Pcell is located is non-dormant, or after the Pcell is activated/reconfigured/timer started, or before the BWP (which can schedule the Pcell) of the Pcell is activated/reconfigured/timer started, the blind detection budget of the terminal may include at least one of the following:

1. the maximum blind detection quantity P of the Pcell is set to 0; or
2. the base station configures new P' and/or S; and/or, the base station configures new S-self and/or CR; and/or, S-selfandother', that is, the base station configures a set of blind detection budget parameters corresponding to the first scheduling configuration for the terminal, including at least one of P', S', S-self, CR', or S-selfandother'.

In a possible implementation, P', S', S-self, CR', and S-selfandother' can satisfy at least one of the following: P'=0; S'>=S; S-self'>=S-self; CR'>CR; or S-selfandother'>=S-selfandother.

In a possible implementation, if the foregoing manner c) is used to determine the blind detection budget of scheduling of the Pcell by the Scell #1, when at least one of the cases described in 1) to 4) occurs, it is determined that within/after the next period of time, or before the control information indicating that the Pcell or the cell group where the Pcell is located is non-dormant, or after the Pcell is activated/reconfigured/timer started, or before the BWP (which can schedule the Pcell) of the Pcell is activated/reconfigured/timer started, the blind detection budget of the terminal may include at least one of the following:

1. a maximum blind detection quantity of the control elements of the Scell #1 that schedule the Pcell is T;
2. a maximum blind detection quantity of the control elements of the Scell #1 that schedule the Pcell and the Scell #1 is T;
3. a maximum blind detection quantity of the control elements of the Scell #1 that schedule the Pcell, the Scell #1, and another Scell is T; or
4. the base station configures new CR' and/or T', that is, the base station configures a set of blind detection budget parameters corresponding to the first scheduling configuration for the terminal, including CR' and/or T'.

In a possible implementation, CR'>=CR, and/or, T'>T or T'<T.

(2) When the first cell is Scell #1, the second cell is Pcell, and the scheduling configuration is the first scheduling configuration, the mapping manner can be determined in the following manner.

In a possible implementation, if the foregoing manner a) is used to determine the blind detection budget of scheduling of the Pcell by the Scell #1, that is, scheduling of the Pcell by the Scell #1 belongs to the budget of the Pcell, when at least one of the cases described in 1) to 4) occurs, the mapping manner can be determined as follows:

When mapping of the control information that schedules the Pcell is performed in a scheduling time unit (for example, occasion/span/slot), non-self-scheduling control information of the Pcell is mapped. For example, self-scheduling search spaces of the Pcell are SS #0/1/2/3/5, a search space of the Scell #1 that schedules the Pcell is SS #4, and search spaces of the Pcell that schedule the Scell #2 are SS #5/6. If the terminal receives control information of the Pcell or the Scell #1 indicating that the Pcell or the cell group where the Pcell is located is dormant, or the Pcell is deactivated, or the BWP (that supports scheduling of the Pcell) of the Pcell is switched, or the BWP (that supports scheduling of the Pcell) of the Pcell is deactivated, the terminal may first map SS #4 on the physical control resources of the Scell #1, and then map SS #5/6 on the physical control resources of the Pcell.

Optionally, in the foregoing mapping solution, the mapping is performed to a quantity of control elements that does not exceed and is closest to P. If there are still unmapped control elements, the mapping is not continued. The maximum blind detection quantity P of the Pcell may be the maximum blind detection quantity of the Pcell in the blind detection budget provided in the embodiments of this application.

In a possible implementation, if the foregoing manner b) is used to determine the blind detection budget of scheduling of the Pcell by the Scell #1, that is, scheduling of the Pcell by the Scell #1 belongs to the budget of the Scell #1, when at least one of the cases described in 1) to 4) occurs, the mapping manner can be determined as follows:

When mapping of the control elements that schedule the Pcell is performed in a scheduling time unit (occasion/span/slot), non-self-scheduling search spaces of the Pcell are mapped. For example, a self-scheduling search space of the Scell #1 is SS #6, and a search space of the Scell #1 that schedules the Pcell is SS #5. If control information of the Pcell or the Scell #1 is received indicating that the Pcell or the cell group where the Pcell is located is dormant, or the Pcell is deactivated, or the BWP (that supports scheduling of the Pcell) of the Pcell is switched, or the BWP (that supports scheduling of the Pcell) of the Pcell is deactivated, the terminal first maps SS #5 and then maps SS #6 when search spaces are mapped on the physical control resources of the Scell #1.

Optionally, in a scheduling time unit, the mapping is performed to a quantity of search spaces that does not exceed and is closest to S. If there are still unmapped search spaces, the mapping is not continued.

In a possible implementation, if the foregoing manner c) is used to determine the blind detection budget of scheduling of the Pcell by the Scell #1, that is, scheduling of the Pcell by the Scell #1 belongs to the joint budget, when at least one of the cases described in 1) to 4) occurs, the mapping manner can be determined as follows:

When mapping of the control elements that schedule the Pcell and/or the Pcell is performed in an occasion/span/slot, control elements of the Scell #1 that schedule the Scell #1 and/or the Pcell are mapped.

(3) When the first cell is Scell #1, the second cell is Pcell, and the scheduling configuration is the second scheduling configuration or the third scheduling configuration, the blind detection budget can be determined in the following manner.

After the scheduling configuration is configured as or switched to the second scheduling configuration or the third scheduling configuration, when at least one of the following cases occurs, the Scell #1 cannot schedule the Pcell (but can be self-scheduled and/or schedule other Scells), or the Scell #1 may not support scheduling of any cell:
  a) the Scell #1 or the Scell group where the Scell #1 is located is indicated by DCI as dormant;
  b) the Scell #1 is deactivated, for example, an inactive Timer of the Scell #1 is not configured or the inactive Timer of the Scell #1 expires, or the deactivation of the Scell #1 is indicated through MAC CE, RRC, or DCI;
  c) the BWP (which can schedule the Pcell) of the Scell #1 is switched, for example, to a BWP that does not support scheduling of the Pcell; or
  d) the BWP (which can schedule the Pcell) of the Scell #1 is deactivated, for example, a BWP inactive Timer is not configured or the inactive Timer expires.

In a possible implementation, if the foregoing manner a) is used to determine the blind detection budget of scheduling of the Pcell by the Scell #1, that is, scheduling of the Pcell by the Scell #1 belongs to the budget of the Pcell, when at least one of the cases described in (a) to (d) occurs, it is determined that within/after the next period of time, or before DCI indicating that the Scell #1 or the Scell group where the Scell #1 is located is non-dormant, or after the Scell #1 is activated/reconfigured/timer started, or before the BWP (which can schedule the Pcell) of the Scell #1 is activated/reconfigured/timer started, the blind detection budget of the terminal may include at least one of the following:

1. CR=0, and/or, P-self=P
2. The base station configures new P-self and/or P', that is, the base station configures a set of blind detection budget parameters corresponding to the second scheduling configuration or the third scheduling configuration for the terminal, including P-self and/or P'.

Optionally, P-self'>=P-self, and/or, P'>=P, where P-self and P are values in another set of blind detection budget parameters configured by the base station for the UE.

Since the Scell #1 cannot schedule the Pcell when any of the foregoing (a) to (d) occurs, the Pcell can only be self-scheduled through the control information of the Pcell. Therefore, the maximum blind detection quantity of P-self may be adjusted, for example, to the maximum blind detection quantity of the Pcell. That is, more scheduling of the Pcell is allowed, to make full use of the idle blind detection quantity in this case.

Optionally, the Pcell is self-scheduled or the P-self includes CSS #3, that is, group common PDCCH.

In a possible implementation, if the foregoing manner b) is used to determine the blind detection budget of scheduling of the Pcell by the Scell #1, that is, scheduling of the Pcell by the Scell #1 belongs to the budget of the Scell #1, when at least one of the cases described in (a) to (d) occurs, it is determined that within/after the next period of time, or before DCI indicating that the Scell #1 or the Scell group where the Scell #1 is located is non-dormant, or after the Scell #1 is activated/reconfigured/timer started, or before the BWP (which can schedule the Pcell) of the Scell #1 is activated/reconfigured/timer started, the blind detection budget of the terminal may include at least one of the following manners 1, 2, or 3:

The manner 1 may include any one of the following:
  (a) CR=0, and/or, S-self=S. Optionally, when it indicates that the Scell #1 is dormant, or the Scell #1 is deactivated, or the BWP (which can schedule the Pcell) of the Scell #1 is switched, or the BWP (which can schedule the Pcell) of the Scell #1 is deactivated, it indicates that the Scell #1 cannot schedule the Pcell, and this manner can be used.
  (b) The base station configures new S-self, that is, the base station configures a set of blind detection budget parameters corresponding to the second scheduling configuration or the third scheduling configuration for the terminal, including S-self.

Optionally, S-self'>=S-self.

Optionally, when it indicates that the Scell #1 is dormant, or the Scell #1 is deactivated, or the BWP (which can schedule the Pcell) of the Scell #1 is switched, or the BWP (which can schedule the Pcell) of the Scell #1 is deactivated, it indicates that the Scell #1 cannot schedule the Pcell, and the manner 1 can be used.

Since the Scell #1 cannot schedule the Pcell in this case, the Scell #1 can only schedule cells except the Pcell (for example, the Scell #1). Therefore, the maximum blind detection quantity of the S-self is adjusted in the manner 1, for example, to the maximum blind detection quantity of the Scell #1. That is, more self-scheduling of the Scell #1 is allowed to make full use of the idle blind detection quantity.

The manner 2 may include any one of the following:
(a) CR=0, and/or, S-selfandother=S; or
(b) The base station configures new S-selfandother', that is, the base station configures a set of blind detection budget parameters corresponding to the second scheduling configuration or the third scheduling configuration for the terminal, including S-selfandother'. Optionally, S-selfandother'>=S-selfandother.

Optionally, when it indicates that the Scell #1 is dormant, or the Scell #1 is deactivated, or the BWP (which can schedule the Pcell) of the Scell #1 is switched, or the BWP (which can schedule the Pcell) of the Scell #1 is deactivated, it indicates that the Scell #1 cannot schedule the Pcell, and the manner 2 can be used.

Since the Scell #1 cannot schedule the Pcell in this case, the Scell #1 can only schedule cells except the Pcell (for example, the Scell #1 and/or other Scells). Therefore, in the case of CA limited, a quantity of cells scheduled by the Scell #1 changes. Therefore, in the manner 2, the S-selfandother is adjusted, for example, to the maximum blind detection quantity of the Scell #1. That is, more self-scheduling of the Scell #1 is allowed to make full use of the idle blind detection quantity in this case.

The manner 3 may include: S=0, that is, the maximum blind detection quantity S of the control elements of the Scell #1 is adjusted to 0.

Optionally, when it indicates that the Scell #1 is dormant, or the Scell #1 is deactivated, or the BWP (which can schedule the Pcell) of the Scell #1 is switched, or the BWP (which can schedule the Pcell) of the Scell #1 is deactivated, it indicates that the Scell #1 cannot schedule any cell, and the manner 3 can be used.

In a possible implementation, if the foregoing manner b) is used to determine the blind detection budget of scheduling of the Pcell by the Scell #1, that is, scheduling of the Pcell by the Scell #1 belongs to the joint budget, when at least one of the cases described in (a) to (d) occurs, it is determined that within/after the next period of time, or before DCI indicating that the Scell #1 or the Scell group where the Scell #1 is located is non-dormant, or after the Scell #1 is activated/reconfigured/timer started, or before the BWP (which can schedule the Pcell) of the Scell #1 is activated/reconfigured/timer started, the blind detection budget of the terminal may include at least one of the following: a maximum blind detection quantity of the control elements of the Scell #1=the joint maximum blind detection quantity T of the control elements of the Pcell and the Scell #1.

(4) When the first cell is Scell #1, the second cell is Pcell, and the scheduling configuration is the second scheduling configuration or the third scheduling configuration, the mapping manner can be determined in the following manner.

In a possible implementation, if the foregoing manner a) is used to determine the blind detection budget of scheduling of the Pcell by the Scell #1, that is, scheduling of the Pcell by the Scell #1 belongs to the budget of the Pcell, when at least one of the cases described in (a) to (d) occurs, the mapping manner can be determined as follows:

When mapping of the control information that schedules the Pcell is performed in a scheduling time unit (for example, occasion/span/slot), self-scheduling search spaces of the Pcell are mapped. For example, self-scheduling search spaces of the Pcell are SS #0/1/2/3/5/6, and a search space of the Scell #1 that schedules the Pcell is SS #4. If control information of the Pcell or the Scell #1 is received indicating that the Scell #1 or the Scell group where the Scell #1 is located is dormant, or the Scell #1 is deactivated, or the BWP (that supports scheduling of the Pcell) of the Scell #1 is switched, or the BWP (that supports scheduling of the Pcell) of the Scell #1 is deactivated, the terminal first maps SS #0/1/2/3 and then maps SS #5/6 when search spaces are mapped on the physical control resources of the Pcell.

Optionally, the mapping is performed to a quantity of control elements that does not exceed and is closest to the maximum blind detection quantity P of the control elements of the Pcell. If there are still unmapped control elements, the mapping is not continued.

In a possible implementation, if the foregoing manner b) is used to determine the blind detection budget of scheduling of the Pcell by the Scell #1, that is, scheduling of the Pcell by the Scell #1 belongs to the budget of the Scell #1, when at least one of the cases described in (a) to (d) occurs, the mapping manner can be determined as follows:

When mapping of the control elements that schedule the Scell #1 is performed in a scheduling time unit (occasion/span/slot), self-scheduling control elements of the Scell #1 are mapped. For example, self-scheduling search spaces of the Scell #1 are SS #4/6, and a search space of the Scell #1 that schedules the Pcell is SS #5. If control information of the Pcell or the Scell #1 is received indicating that the Scell #1 or the Scell group where the Scell #1 is located is dormant, or the Scell #1 is deactivated, or the BWP (that supports scheduling of the Pcell) of the Scell #1 is switched, or the BWP (that supports scheduling of the Pcell) of the Scell #1 is deactivated, the terminal first maps SS #4 and then maps SS #6 when search spaces are mapped on the physical control resources of the Scell #1.

Optionally, the mapping is performed to a quantity of control elements that does not exceed and is closest to S. If there are still unmapped control elements, the mapping is not continued.

In a possible implementation, if the foregoing manner b) is used to determine the blind detection budget of scheduling of the Pcell by the Scell #1, that is, scheduling of the Pcell by the Scell #1 belongs to the joint budget, when at least one of the cases described in (a) to (d) occurs, the mapping manner can be determined as follows:

When mapping of the control elements that schedule the Scell #1 and/or the Pcell is performed in a scheduling time unit (occasion/span/slot), self-scheduling control elements of the Scell #1 and/or the Pcell are mapped.

Through the foregoing technical solutions provided in the embodiments of this application, flexible blind detection capability allocation can be provided, and the capacity of downlink control information during power saving can be guaranteed.

It should be noted that, for the information transmission method provided in the embodiments of this application, the execution entity may be an information transmission apparatus, or a control module in the information transmission apparatus for performing the information transmission method. In this embodiment of this application, the information transmission apparatus provided in the embodiments of this application is described by taking the information transmission method performed by the information transmission apparatus as an example.

Figure 3:
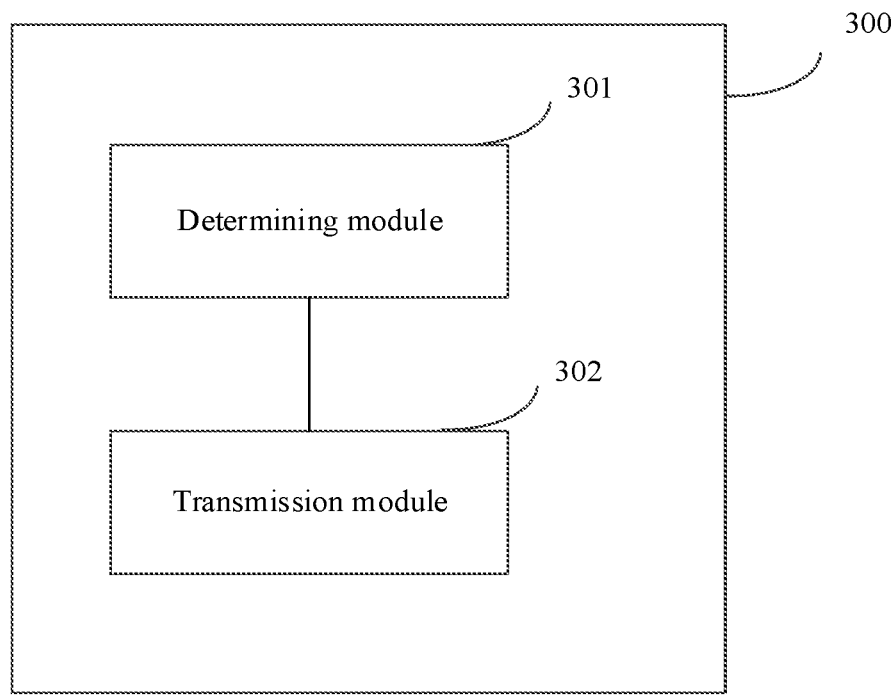
FIG. 3 is a schematic structural diagram of an information transmission apparatus according to an embodiment of this application.

FIG. 3 is a schematic structural diagram of an information transmission apparatus according to an embodiment of this application. As shown in FIG. 3, the information transmission apparatus 300 may include: a determining module 301, configured to determine, according to a scheduling configuration of a first cell and/or a second cell of a terminal, a target blind detection budget and/or a target mapping manner of the terminal, where the second cell supports scheduling by the first cell, or the second cell supports self-scheduling and the second cell supports scheduling by the first cell; and a transmission module 302, configured to perform information transmission according to the target blind detection budget and/or the target mapping manner, where the target blind detection budget includes at least one of the following: a blind detection budget in the first cell; a blind detection budget in the second cell; or a joint blind detection budget in the first cell and the second cell; and the target mapping manner is a mapping manner in which control elements of the first cell and/or the second cell are mapped to physical control resources.

In a possible implementation, the scheduling configuration of the first cell and/or the second cell includes any one of the following: a first scheduling configuration, a second scheduling configuration, or a third scheduling configuration, where the first scheduling configuration is that the first cell supports scheduling of the second cell, and the second cell does not support self-scheduling or the second cell does not support scheduling of any cell; the second scheduling configuration is that control information in a common search space of the second cell supports self-scheduling by the second cell, and the first cell can schedule the second cell; and the third scheduling configuration is that control information in the common search space and a terminal-specific search space of the second cell supports scheduling of the second cell, and the first cell can schedule the second cell.

In a possible implementation, if the scheduling configuration is the second scheduling configuration and a first condition is satisfied, the control information in the common search space of the second cell supports scheduling of the second cell; or the second cell only supports scheduling by the control information in the common search space of the second cell.

In a possible implementation, if the scheduling configuration is the third scheduling configuration, and a first condition is satisfied, the control information in the common search space and the terminal-specific search space of the second cell supports scheduling of the second cell; or the second cell only supports scheduling by the control information in the common search space and the terminal-specific search space of the second cell.

In a possible implementation, the determining module 301 determines that the scheduling configuration is the first scheduling configuration in a case that at least one of the following is satisfied: first control information is transmitted, where the first control information indicates that the second cell or a second cell group is dormant, and the second cell group is a cell group in which the second cell is located; the second cell is deactivated; a BWP of the second cell is switched to a BWP that does not support scheduling of the second cell; or the BWP of the second cell is deactivated.

In a possible implementation, the determining, by the determining module 301, a target blind detection budget according to a scheduling configuration of a first cell and/or a second cell includes: determining, if the scheduling configuration is the first scheduling configuration, that a first blind detection upper limit is equal to a maximum blind detection quantity of the control elements of the second cell, where the first blind detection upper limit is a maximum blind detection quantity of control elements of the first cell that schedule the second cell; and/or determining, if the scheduling configuration is the first scheduling configuration, that a second blind detection upper limit is equal to 0, where the second blind detection upper limit is a maximum blind detection quantity of self-scheduling control elements of the second cell.

In a possible implementation, the determining, by the determining module 301, a target blind detection budget according to a scheduling configuration of a first cell and/or a second cell includes: determining the target blind detection budget by using first maximum blind detection parameters corresponding to the first scheduling configuration if the scheduling configuration is the first scheduling configuration.

In a possible implementation, the terminal is further provided with second maximum blind detection parameters, and the first maximum blind detection parameters and the second maximum blind detection parameters satisfy at least one of the following:
  a first blind detection upper limit in the first maximum blind detection parameters is greater than a first blind detection upper limit in the second maximum blind detection parameters, where the first blind detection upper limit is a maximum blind detection quantity of control elements of the first cell that schedule the second cell; or
  a third blind detection upper limit in the first maximum blind detection parameters is greater than a third blind detection upper limit in the second maximum blind detection parameters, where the third blind detection upper limit is a maximum blind detection quantity of the control elements of the first cell.

In a possible implementation, the determining, by the determining module 301, a target blind detection budget according to a scheduling configuration of a first cell and/or a second cell includes:
  determining, if the scheduling configuration is the first scheduling configuration, that a fourth blind detection upper limit is equal to 0, where the fourth blind detection upper limit is a maximum blind detection quantity of the control elements of the second cell; or
  determining the target blind detection budget by using third maximum blind detection parameters corresponding to the first scheduling configuration.

In a possible implementation, the terminal is further provided with fourth maximum blind detection parameters, and the third maximum blind detection parameters and the fourth maximum blind detection parameters satisfy at least one of the following:
  a fourth blind detection upper limit in the third maximum blind detection parameters is equal to 0, where the fourth blind detection upper limit is the maximum blind detection quantity of the control elements of the second cell;
  a third blind detection upper limit in the third maximum blind detection parameters is greater than a fourth blind detection upper limit in the fourth maximum blind detection parameters, where the third blind detection upper limit is a maximum blind detection quantity of the control elements of the first cell;
  a fifth blind detection upper limit in the third maximum blind detection parameters is greater than a fifth blind detection upper limit in the fourth maximum blind detection parameters, where the fifth blind detection upper limit is a maximum blind detection quantity of self-scheduling control elements of the first cell;
  a first blind detection upper limit in the third maximum blind detection parameters is greater than a sixth blind detection upper limit in the fourth maximum blind detection parameters, where the first blind detection upper limit is a maximum blind detection quantity of control elements of the first cell that schedule the second cell; or a sixth blind detection upper limit in the third maximum blind detection parameters is greater than a sixth blind detection upper limit in the fourth maximum blind detection parameters, where the sixth blind detection upper limit is a maximum blind detection quantity of control elements of the first cell that schedule the first cell and a third cell.

In a possible implementation, the determining, by the determining module 301, a target blind detection budget according to a scheduling configuration of a first cell and/or a second cell includes any one of the following:

determining, if the scheduling configuration is the first scheduling configuration, that a first blind detection upper limit is equal to a joint maximum blind detection quantity of the control elements of the first cell and the second cell, where the first blind detection upper limit is a maximum blind detection quantity of control elements of the first cell that schedule the second cell;

determining, if the scheduling configuration is the first scheduling configuration, that a seventh blind detection upper limit is equal to the joint maximum blind detection quantity of the control elements of the first cell and the second cell, where the seventh blind detection upper limit is a maximum blind detection quantity of control elements of the first cell that schedule the first cell and the second cell; or determining, if the scheduling configuration is the first scheduling configuration, that an eighth blind detection upper limit is equal to the joint maximum blind detection quantity of the control elements of the first cell and the second cell, where the eighth blind detection upper limit is a maximum blind detection quantity of control elements of the first cell that schedule the second cell, the first cell, and a third cell.

In a possible implementation, the determining, by the determining module 301, a target blind detection budget according to a scheduling configuration of a first cell and/or a second cell includes: determining the target blind detection budget by using fifth maximum blind detection parameters corresponding to the first scheduling configuration if the scheduling configuration is the first scheduling configuration.

In a possible implementation, sixth maximum blind detection parameters are further configured, and the fifth maximum blind detection parameters and the sixth maximum blind detection parameters satisfy at least one of the following:

a first blind detection upper limit in the fifth maximum blind detection parameters is greater than a first blind detection upper limit in the sixth maximum blind detection parameters, where the first blind detection upper limit is a maximum blind detection quantity of control elements of the first cell that schedule the second cell; or a ninth blind detection upper limit in the fifth maximum blind detection parameters is greater than or less than a ninth blind detection upper limit in the sixth maximum blind detection parameters, where the ninth blind detection upper limit is a joint maximum blind detection quantity of the control elements of the first cell and the second cell.

In a possible implementation, the target blind detection budget determined by the determining module 301 is a blind detection budget of the terminal at any of the following times: within a first predetermined time or after a second predetermined time when it is determined that the scheduling configuration is the first scheduling configuration; before second control information is received, where the second control information indicates that the second cell or a second cell group is non-dormant, and the second cell group is a cell group in which the second cell is located; before the second cell is activated; before the second cell is reconfigured; before a first timer of the second cell is started; before a first target BWP of the second cell is activated, where the first target BWP is a BWP that supports scheduling of the second cell; before the first target BWP of the second cell is reconfigured; or before a second timer of the first target BWP of the second cell is started.

In a possible implementation, the determining module 301 is further configured to: determine, if the scheduling configuration is the second scheduling configuration or the third scheduling configuration, and a first condition is satisfied, that the first cell does not support scheduling of the second cell, or the first cell does not support scheduling of any cell.

In a possible implementation, the determining, by the determining module 301, a target blind detection budget according to a scheduling configuration of a first cell and/or a second cell includes:

determining that a first blind detection upper limit is equal to 0, where the first blind detection upper limit is a maximum blind detection quantity of control elements of the first cell that schedule the second cell; and/or determining that a second blind detection upper limit is equal to a maximum blind detection quantity of the control elements of the second cell, where the second blind detection upper limit is a maximum blind detection quantity of self-scheduling control elements of the second cell.

In a possible implementation, the determining, by the determining module 301, a target blind detection budget according to a scheduling configuration of a first cell and/or a second cell includes: determining the target blind detection budget by using seventh maximum blind detection parameters.

In a possible implementation, the terminal is further provided with eighth maximum blind detection parameters, and the seventh maximum blind detection parameters and the eighth maximum blind detection parameters satisfy at least one of the following:

a second blind detection upper limit in the seventh maximum blind detection parameters is greater than a second blind detection upper limit in the eighth maximum blind detection parameters, where the second blind detection upper limit is a maximum blind detection quantity of self-scheduling control elements of the second cell; or a fourth blind detection upper limit in the seventh maximum blind detection parameters is greater than a fourth blind detection upper limit in the eighth maximum blind detection parameters, where the fourth blind detection upper limit is a maximum blind detection quantity of the control elements of the second cell.

In a possible implementation, the determining, by the determining module 301, a target blind detection budget according to a scheduling configuration of a first cell and/or a second cell includes at least one of the following:

determining that a first blind detection upper limit is equal to 0, where the first blind detection upper limit is a maximum blind detection quantity of control elements of the first cell that schedule the second cell;

determining that a fifth blind detection upper limit is equal to a maximum blind detection quantity of the control elements of the first cell, where the fifth blind detection upper limit is a maximum blind detection quantity of self-scheduling control elements of the first cell;

determining that a sixth blind detection upper limit is equal to the maximum blind detection quantity of the control elements of the first cell, where the sixth blind detection upper limit is a maximum blind detection quantity of control elements of the first cell that schedule the first cell and a third cell; or determining that a third blind detection upper limit is equal to 0, where the third blind detection upper limit is the maximum blind detection quantity of the control elements of the first cell.

In a possible implementation, the determining a target blind detection budget according to a scheduling configuration of a first cell and/or a second cell includes: determining the target blind detection budget by using ninth maximum blind detection parameters.

In a possible implementation, the terminal further includes tenth maximum blind detection parameters, and the ninth maximum blind detection parameters and the tenth maximum blind detection parameters satisfy at least one of the following:

a fifth blind detection upper limit in the ninth maximum blind detection parameters is greater than a fifth blind detection upper limit in the tenth maximum blind detection parameters, where the fifth blind detection upper limit is a maximum blind detection quantity of self-scheduling control elements of the first cell; or a sixth blind detection upper limit in the ninth maximum blind detection parameters is greater than a sixth blind detection upper limit in the tenth maximum blind detection parameters, where the sixth blind detection upper limit is a maximum blind detection quantity of control elements of the first cell that schedule the first cell and a third cell.

In a possible implementation, the determining, by the determining module 301, a target blind detection budget according to a scheduling configuration of a first cell and/or a second cell includes: determining that a tenth blind detection upper limit is equal to a joint maximum blind detection quantity of the control elements of the first cell and the second cell, where the tenth blind detection upper limit is a maximum blind detection quantity of control elements of the first cell that do not schedule the second cell.

In a possible implementation, the target blind detection budget determined by the determining module 301 is a blind detection budget of the terminal at any of the following times: within a third predetermined time or after a fourth predetermined time when it is determined that the first cell does not support scheduling of the second cell or the first cell does not support scheduling of any cell; before fourth control information is transmitted, where the fourth control information indicates that the first cell or the first cell group is non-dormant; before the first cell is activated; before the first cell is reconfigured; before a third timer of the first cell is started; before a second target BWP of the first cell is activated, where the second target BWP is a BWP that supports scheduling of the second cell; before the second target BWP of the first cell is reconfigured; or before a fourth timer of the second target BWP of the first cell is started.

In a possible implementation, the first condition includes at least one of the following: third control information is transmitted, where the third control information indicates that the first cell or a first cell group is dormant, and the first cell group is a cell group in which the first cell is located; the first cell is deactivated; a BWP of the first cell is switched to a BWP that does not support scheduling of the second cell; or the BWP of the first cell is deactivated.

In a possible implementation, the determining, by the determining module 301, a target mapping manner according to a scheduling configuration of a first cell and/or a second cell includes: if the scheduling configuration is the first scheduling configuration, when mapping of the control elements of the second cell is performed in a scheduling time unit, mapping non-self-scheduling control elements of the second cell on the physical control resources of the second cell, and/or mapping control elements of the first cell that schedule the second cell on the physical control resources of the first cell.

In a possible implementation, in a scheduling time unit, a total quantity of mapped control elements does not exceed a maximum blind detection quantity supported by the second cell.

In a possible implementation, in a scheduling time unit, a total quantity of mapped control elements does not exceed a maximum blind detection quantity of the first cell.

In a possible implementation, the determining, by the determining module 301, a target mapping manner according to a scheduling configuration of a first cell and/or a second cell includes: if the scheduling configuration is the first scheduling configuration, when mapping of the control elements of the second cell and/or the control elements of the first cell is performed in a scheduling time unit, mapping self-scheduling control elements of the first cell on the physical control resources of the first cell; and/or mapping control elements of the first cell that schedule the second cell on the physical control resources of the first cell.

In a possible implementation, in a scheduling time unit, a total quantity of mapped control elements does not exceed the joint maximum blind detection quantity of the control elements of the first cell and the second cell.

In a possible implementation, the determining, by the determining module 301, a target mapping manner according to a scheduling configuration of a first cell and/or a second cell includes: if the scheduling configuration is the second scheduling configuration or the third scheduling configuration and the first condition is satisfied, when mapping of the control elements of the second cell is performed in a scheduling time unit, mapping self-scheduling control elements of the second cell on the physical control resources of the second cell.

In a possible implementation, in a scheduling time unit, a total quantity of mapped control elements does not exceed a maximum blind detection quantity of the control elements of the second cell.

In a possible implementation, the determining, by the determining module 301, a target mapping manner according to a scheduling configuration of a first cell and/or a second cell includes: if the scheduling configuration is the second scheduling configuration or the third scheduling configuration and the first condition is satisfied, when mapping of the control elements of the first cell is performed in a scheduling time unit: mapping self-scheduling control elements of the first cell on the physical control resources of the first cell; and/or mapping control elements of the first cell that schedule the third cell on the physical control resources of the first cell.

In a possible implementation, in a scheduling time unit, a total quantity of control elements mapped on the physical control resources of the first cell does not exceed the maximum blind detection quantity of the control elements of the first cell.

In a possible implementation, the determining, by the determining module 301, a target mapping manner according to a scheduling configuration of a first cell and/or a second cell includes: if the scheduling configuration is the second scheduling configuration or the third scheduling configuration and the first condition is satisfied, when mapping of the control elements of the first cell and/or the second cell is performed in a scheduling time unit: mapping self-scheduling control elements of the second cell on the physical control resources of the second cell; and/or mapping self-scheduling control elements of the first cell on the physical control resources of the first cell.

In a possible implementation, in a scheduling time unit, a total quantity does not exceed the joint maximum blind detection quantity of the control elements of the first cell and the second cell.

In a possible implementation, the determining module 301 is further configured to, when determining the target mapping manner, perform mapping of the control elements of the first cell and/or the second cell in a scheduling time unit according to a mapping sequence, where the mapping sequence includes at least one of the following: mapping self-scheduling control elements of a target cell on physical control resources of the target cell, and then mapping control elements of the target cell that schedule other cells, where the target cell includes the first cell or the second cell; performing mapping in descending order or ascending order of control element identifiers; or mapping common control elements on the physical control resources of the target cell, and then mapping terminal-specific control elements.

In a possible implementation, the first cell is a secondary cell, and the second cell is a primary cell.

The information transmission apparatus in this embodiment of this application may be an apparatus, or may be a component, an integrated circuit, or a chip in a terminal or a network side device. The terminal may be a mobile terminal or may be a non-mobile terminal. For example, the mobile terminal may include, but is not limited to, the types of the terminal 11 listed above, and the non-mobile terminal may be a server, a network attached storage (Network Attached Storage, NAS), a personal computer (personal computer, PC), a television (television, TV), a teller machine, a self-service machine, or the like. This is not specifically limited in this embodiment of this application. The network side device may include, but is not limited to, the types of the network side device 12 listed above.

The information transmission apparatus in the embodiments of this application may be an apparatus having an operating system. The operating system may be an Android (Android) operating system, may be an ios operating system, or may be another possible operating system, and is not specifically limited in the embodiments of this application.

The information transmission apparatus provided in the embodiments of this application can implement the processes implemented in the method embodiment of FIG. 2, and achieve the same technical effects. To avoid repetition, details are not described herein again.

Figure 4:
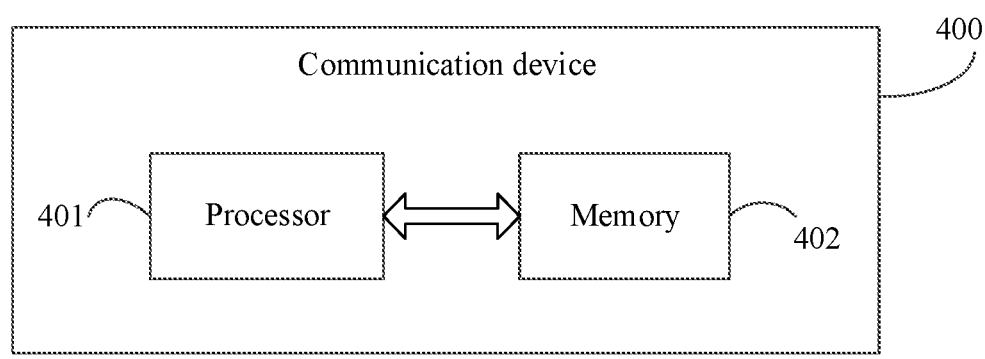
FIG. 4 is a schematic structural diagram of a communication device according to an embodiment of this application.

Optionally, as shown in FIG. 4, the embodiments of this application further provide a communication device 400, including a processor 401, a memory 402, and a program or instructions stored in the memory 402 and runnable on the processor 401. For example, the communication device 400 is a terminal or a network side device. The program or the instructions, when executed by the processor 401, implement the processes of the embodiments of the information transmission method, and can achieve the same technical effects. To avoid repetition, details are not described herein again.

Figure 5:
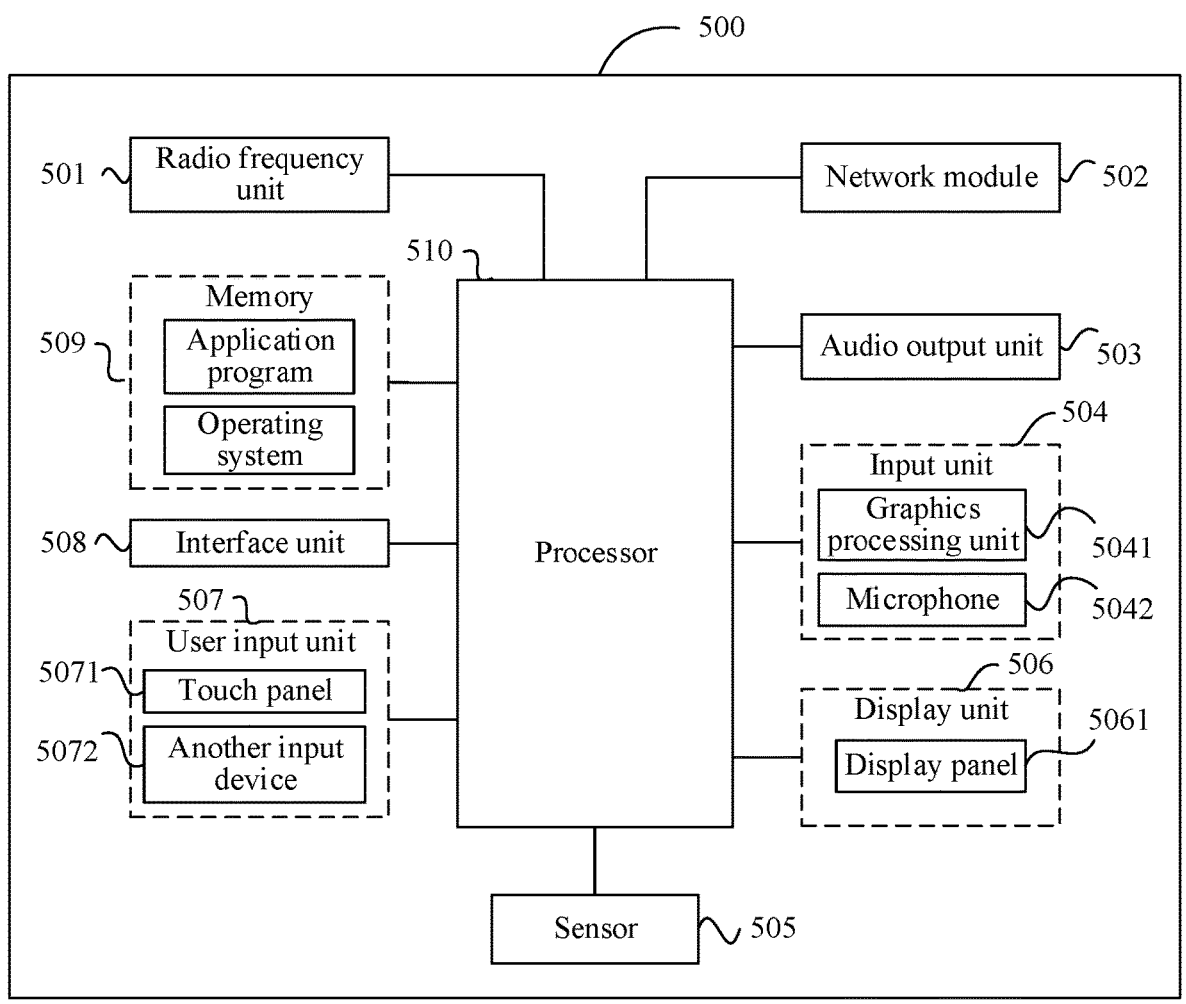
FIG. 5 is a schematic structural diagram of hardware of a terminal according to an embodiment of this application.

FIG. 5 is a schematic structural diagram of hardware of a terminal according to an embodiment of this application.

The terminal 500 includes, but is not limited to, components such as a radio frequency unit 501, a network module 502, an audio output unit 503, an input unit 504, a sensor 505, a display unit 506, a user input unit 507, an interface unit 508, a memory 509, and a processor 510.

A person skilled in the art may understand that the terminal 500 may further include the power supply (for example, a battery) for supplying power to the components. The power supply may be logically connected to the processor 510 by using a power management system, thereby implementing functions such as charging, discharging, and power consumption management by using the power management system. A terminal structure shown in FIG. 5 does not constitute a limitation to the terminal, and the terminal may include more or fewer components than those shown in the figure, or some components may be combined, or a different component deployment may be used. Details are not described herein again.

It should be understood that in the embodiments of this application, the input unit 504 may include a graphics processing unit (GPU) 5041 and a microphone 5042, and the graphics processing unit 5041 processes image data of still images or videos obtained by an image capture device (for example, a camera) in a video capture mode or an image capture mode. The display unit 506 may include a display panel 5061, and the display panel 5061 may be configured in a form such as a liquid crystal display or an organic light-emitting diode. The user input unit 507 includes a touch panel 5071 and another input device 5072. The touch panel 5071 is also referred to as a touchscreen. The touch panel 5071 may include two parts: a touch detection apparatus and a touch controller. the another input device 5072 may include, but is not limited to, a physical keyboard, a functional key (such as a volume control key or a switch key), a track ball, a mouse, and a joystick, which are not repeated herein.

In this embodiment of this application, after the radio frequency unit 501 receives downlink data from a network side device, the downlink data is processed by the processor 510. In addition, uplink data is sent to the network side device. Generally, the radio frequency unit 501 includes, but is not limited to, an antenna, at least one amplifier, a transceiver, a coupler, a low noise amplifier, a duplexer, and the like.

The memory 509 may be configured to store software programs or instructions, and various pieces of data. The memory 509 may mainly include a program or instruction storage area and a data storage area. The program or instruction storage area may store an operating system, an application program or instruction required by at least one function (for example, a sound playing function and an image playing function), or the like. In addition, the memory 509 may include a high-speed random access memory, and may further include a non-volatile memory. The non-volatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM), or a flash memory. The memory may include, for example, at least one magnetic disk storage device, a flash memory device, or other volatile solid-state storage devices.

The processor 510 may include one or more processing units. Optionally, the processor 510 may integrate an application processor and a modem processor. The application processor mainly processes an operating system, a user interface, an application program or instruction, and the like. The modem processor mainly processes wireless communication, and may be, for example, a baseband processor. It can be understood that, the modem processor may not be integrated into the processor 510.

The processor 510 is configured to: determine, according to a scheduling configuration of a first cell and/or a second cell of a terminal, a target blind detection budget and/or a target mapping manner of the terminal, where the second cell supports scheduling by the first cell, or the second cell supports self-scheduling and the second cell supports scheduling by the first cell; and perform information transmission according to the target blind detection budget and/or the target mapping manner, where the target blind detection budget includes at least one of the following: a blind detection budget in the first cell; a blind detection budget in the second cell; or a joint blind detection budget in the first cell and the second cell; and the target mapping manner is a mapping manner in which control elements of the first cell and/or the second cell are mapped to physical control resources.

The terminal in the embodiments of the present disclosure further includes: instructions or a program stored in the memory 509 and runnable on the processor 510. The processor 510 invokes the instructions or the program in the memory 509 to perform the method executed by each module shown in FIG. 3, and achieve the same technical effects. To avoid repetition, details are not repeated herein.

Figure 6:
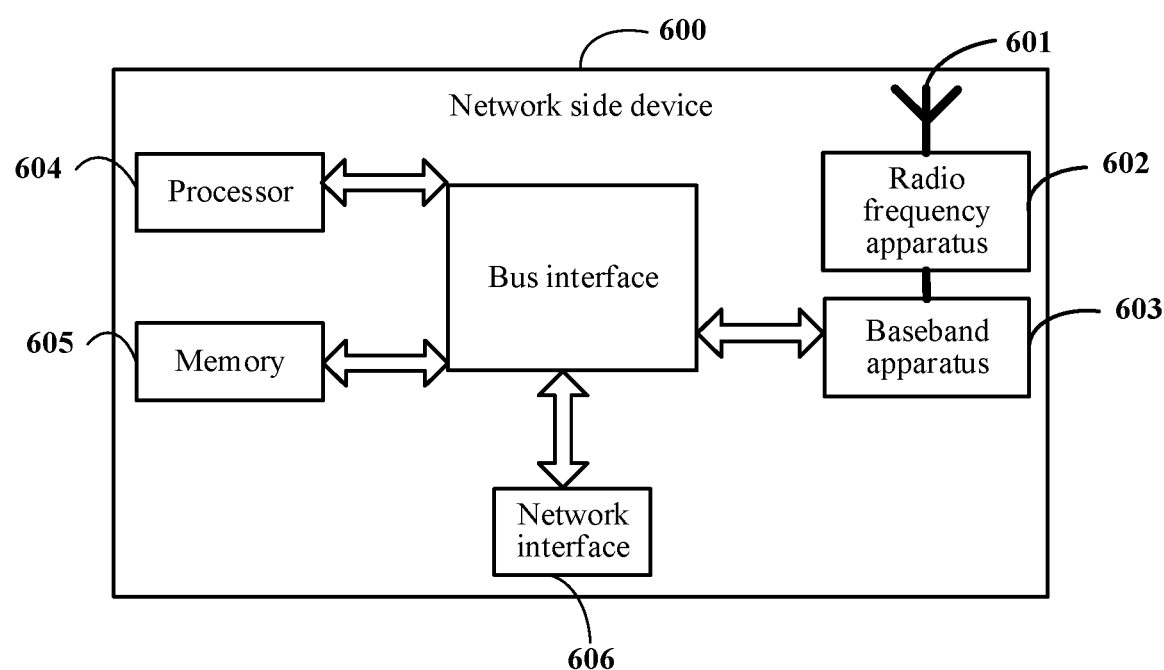
FIG. 6 is a schematic structural diagram of hardware of a network side device according to an embodiment of this application.

Alternatively, an embodiment of this application further provides a network side device. As shown in FIG. 6, the network device 6000 includes: an antenna 601, a radio frequency apparatus 602, and a baseband apparatus 603. The antenna 601 is connected to the radio frequency apparatus 602. In an uplink direction, the radio frequency apparatus 602 receives information by using the antenna 601, and sends the received information to the baseband apparatus 603 for processing. In a downlink direction, the baseband apparatus 603 processes information to be sent, and sends the information to the radio frequency apparatus 602. The radio frequency apparatus 602 processes the received information and sends the information by using the antenna 601.

The frequency band processing apparatus may be located in the baseband apparatus 603, and the method performed by the network side device in the foregoing embodiment may be implemented in the baseband apparatus 603, where the baseband apparatus 603 includes a processor 604 and a memory 605.

The baseband apparatus 603 may include, for example, at least one baseband plate. A plurality of chips are disposed on the baseband plate. As shown in FIG. 6, one of the plurality of chips is, for example, the processor 604, and is connected to the memory 605, to invoke a program in the memory 605 to perform operations of the network device in the foregoing method embodiment.

The baseband apparatus 603 may further include a network interface 606, configured to exchange information with the radio frequency apparatus 602. The interface is, for example, a common public radio interface (CPRI).

Alternatively, the network side device in the embodiments of the present disclosure further includes: instructions or a program stored in the memory 605 and runnable on the processor 604. The processor 604 invokes the instructions or the program in the memory 605 to perform the method executed by each module shown in FIG. 3, and achieve the same technical effects. To avoid repetition, details are not repeated herein.

The embodiments of this application further provide a readable storage medium, storing a program or instructions, the program or the instructions, when executed by a processor, implementing the processes of the foregoing embodiments of the information transmission method and achieving the same technical effects, which is not described herein again to avoid repetition.

The processor is the processor in the terminal described in the foregoing embodiment. The readable storage medium includes a computer-readable storage medium, and is, for example, a read-only memory (ROM), a random access memory (RAM), a magnetic disk, or an optical disc.

The embodiments of this application further provide a chip, where the chip includes a processor and a communication interface, the communication interface is coupled to the processor, and the processor is configured to run a program or instructions of a network side device, to implement the processes of the foregoing embodiments of the information transmission method and achieve the same technical effects, which is not described herein again to avoid repetition.

It should be understood that, the chip mentioned in this embodiment of this application may also be referred to as a system-level chip, a system chip, a chip system, a system on chip, or the like.

It should be noted that, the term "include", "comprise" or any other variation thereof herein is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. Further, it should be noted that the scope of the method and the apparatus in the implementations of this application is not limited to performing the functions in the order shown or discussed, but may further include performing the functions in a substantially simultaneous manner or in the reverse order depending on the functions involved. For example, the described method may be performed in an order different from that described, and various steps may be further added, omitted, or combined. In addition, features described with reference to some examples may be combined in other examples.

Through the descriptions of the foregoing implementations, a person skilled in the art may clearly understand that the methods in the foregoing embodiments may be implemented via software and a necessary general hardware platform, and certainly, may also be implemented by hardware, but in many cases, the former manner is a better implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the method described in the embodiments of this application.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. An information transmission or reception method performed by a communication device, comprising:
    determining, according to a scheduling configuration of a first cell and/or a second cell of a terminal, a target blind detection budget of the terminal, wherein the second cell supports scheduling by the first cell, or the second cell supports self-scheduling and the second cell supports scheduling by the first cell; and
    performing information transmission or reception according to the target blind detection budget, wherein
    the determining, according to a scheduling configuration of a first cell and/or a second cell of a terminal, a target blind detection budget of the terminal comprises:
    determining, in a case that a first condition is satisfied, that a first blind detection upper limit is equal to 0 and/or that a second blind detection upper limit is equal to a maximum blind detection quantity of control elements of the second cell; wherein the first blind detection upper limit is a maximum blind detection quantity of control elements of the first cell that schedule the second cell, and the second blind detection upper limit is a maximum blind detection quantity of self-scheduling control elements of the second cell; and
    the first condition comprises at least one of the following:
    third control information is transmitted or received, wherein the third control information indicates that the first cell or a first cell group is dormant, and the first cell group is a cell group in which the first cell is located;
    the first cell is deactivated;
    a bandwidth part (BWP) of the first cell is switched to a BWP that does not support scheduling of the second cell; or
    the BWP of the first cell is deactivated.

2. The method according to claim 1, wherein the scheduling configuration of the first cell and/or the second cell comprises any one of the following: a first scheduling configuration, a second scheduling configuration, or a third scheduling configuration, wherein
    the first scheduling configuration is that the second cell supports scheduling by the first cell and the second cell does not support self-scheduling, or the second cell supports scheduling by the first cell and the second cell does not support scheduling of any cell;
    the second scheduling configuration is that control information in a common search space of the second cell supports self-scheduling by the second cell, and the second cell supports scheduling by the first cell; and
    the third scheduling configuration is that control information in the common search space and a terminal-specific search space of the second cell supports scheduling of the second cell, and the second cell supports scheduling by the first cell.

3. The method according to claim 2, wherein it is determined that the scheduling configuration is the first scheduling configuration in a case that at least one of the following is satisfied:
    first control information is transmitted or received, wherein the first control information indicates that the second cell or a second cell group is dormant, and the second cell group is a cell group in which the second cell is located;
    the second cell is deactivated;
    a BWP of the second cell is switched to a BWP that does not support scheduling of the second cell; or
    the BWP of the second cell is deactivated.

4. The method according to claim 2, wherein the determining a target blind detection budget according to a scheduling configuration of a first cell and/or a second cell comprises at least one of the following:
    determining, in a case that the scheduling configuration is the first scheduling configuration, that the first blind detection upper limit is equal to a maximum blind detection quantity of the control elements of the second cell; or
    determining, in a case that the scheduling configuration is the first scheduling configuration, that the second blind detection upper limit is equal to 0.

5. The method according to claim 2, wherein the determining a target blind detection budget according to a scheduling configuration of a first cell and/or a second cell comprises:
    determining the target blind detection budget by using first maximum blind detection parameters corresponding to the first scheduling configuration if the scheduling configuration is the first scheduling configuration,
    wherein the terminal is further provided with second maximum blind detection parameters, and the first maximum blind detection parameters and the second maximum blind detection parameters satisfy at least one of the following:
    a first blind detection upper limit in the first maximum blind detection parameters is greater than a first blind detection upper limit in the second maximum blind detection parameters, wherein the first blind detection upper limit is a maximum blind detection quantity of control elements of the first cell that schedule the second cell; or
    a third blind detection upper limit in the first maximum blind detection parameters is greater than a third blind detection upper limit in the second maximum blind detection parameters, wherein the third blind detection upper limit is a maximum blind detection quantity of the control elements of the first cell.

6. The method according to claim 2, wherein the determining a target blind detection budget according to a scheduling configuration of a first cell and/or a second cell comprises:
    determining, in a case that the scheduling configuration is the first scheduling configuration, that a fourth blind detection upper limit is equal to 0, wherein the fourth blind detection upper limit is a maximum blind detection quantity of the control elements of the second cell; or
    determining the target blind detection budget by using third maximum blind detection parameters corresponding to the first scheduling configuration,
    wherein the terminal is further provided with fourth maximum blind detection parameters, and the third maximum blind detection parameters and the fourth maximum blind detection parameters satisfy at least one of the following:
    a fourth blind detection upper limit in the third maximum blind detection parameters is equal to 0, wherein the fourth blind detection upper limit is the maximum blind detection quantity of the control elements of the second cell;
a third blind detection upper limit in the third maximum blind detection parameters is greater than a fourth blind detection upper limit in the fourth maximum blind detection parameters, wherein the third blind detection upper limit is a maximum blind detection quantity of the control elements of the first cell;
a fifth blind detection upper limit in the third maximum blind detection parameters is greater than a fifth blind detection upper limit in the fourth maximum blind detection parameters, wherein the fifth blind detection upper limit is a maximum blind detection quantity of self-scheduling control elements of the first cell;
a first blind detection upper limit in the third maximum blind detection parameters is greater than a sixth blind detection upper limit in the fourth maximum blind detection parameters, wherein the first blind detection upper limit is a maximum blind detection quantity of control elements of the first cell that schedule the second cell; or
a sixth blind detection upper limit in the third maximum blind detection parameters is greater than a sixth blind detection upper limit in the fourth maximum blind detection parameters, wherein the sixth blind detection upper limit is a maximum blind detection quantity of control elements of the first cell that schedule the first cell and a third cell.

7. The method according to claim 2, wherein the determining a target blind detection budget according to a scheduling configuration of a first cell and/or a second cell comprises any one of the following:
determining, in a case that the scheduling configuration is the first scheduling configuration, that the first blind detection upper limit is equal to a joint maximum blind detection quantity of the control elements of the first cell and the second cell;
determining, in a case that the scheduling configuration is the first scheduling configuration, that a seventh blind detection upper limit is equal to the joint maximum blind detection quantity of the control elements of the first cell and the second cell, wherein the seventh blind detection upper limit is a maximum blind detection quantity of control elements of the first cell that schedule the first cell and the second cell; or
determining, in a case that the scheduling configuration is the first scheduling configuration, that an eighth blind detection upper limit is equal to the joint maximum blind detection quantity of the control elements of the first cell and the second cell, wherein the eighth blind detection upper limit is a maximum blind detection quantity of control elements of the first cell that schedule the second cell, the first cell, and a third cell.

8. The method according to claim 2, wherein the determining a target blind detection budget according to a scheduling configuration of a first cell and/or a second cell comprises:
determining the target blind detection budget by using fifth maximum blind detection parameters corresponding to the first scheduling configuration in a case that the scheduling configuration is the first scheduling configuration,
wherein the terminal is further provided with sixth maximum blind detection parameters, and the fifth maximum blind detection parameters and the sixth maximum blind detection parameters satisfy at least one of the following:
a first blind detection upper limit in the fifth maximum blind detection parameters is greater than a first blind detection upper limit in the sixth maximum blind detection parameters, wherein the first blind detection upper limit is a maximum blind detection quantity of control elements of the first cell that schedule the second cell; or
a ninth blind detection upper limit in the fifth maximum blind detection parameters is greater than or less than a ninth blind detection upper limit in the sixth maximum blind detection parameters, wherein the ninth blind detection upper limit is a joint maximum blind detection quantity of the control elements of the first cell and the second cell.

9. The method according to claim 2, wherein determining, in a case that the scheduling configuration is the second scheduling configuration or the third scheduling configuration, and that the first condition is satisfied, that the first blind detection upper limit is equal to 0 and/or that the second blind detection upper limit is equal to a maximum blind detection quantity of control elements of the second cell comprises:
determining, in a case that the scheduling configuration is the second scheduling configuration or the third scheduling configuration, and that the first condition is satisfied, that the first cell does not support scheduling of the second cell, or that the first cell does not support scheduling of any cell; and
determining, in a case of determining that the first cell does not support scheduling of the second cell, or that the first cell does not support scheduling of any cell, that the first blind detection upper limit is equal to 0 and/or that the second blind detection upper limit is equal to a maximum blind detection quantity of control elements of the second cell.

10. A communication device, comprising a terminal or a network side device, wherein the communication device comprises:
a processor; and
a memory storing a program or instruction that is runnable on the processor, wherein the program or the instruction, when executed by the processor, causes the communication device to:
determine, according to a scheduling configuration of a first cell and/or a second cell of a terminal, a target blind detection budget of the terminal, wherein the second cell supports scheduling by the first cell, or the second cell supports self-scheduling and the second cell supports scheduling by the first cell; and
perform information transmission or reception according to the target blind detection budget, wherein
the determine, according to a scheduling configuration of a first cell and/or a second cell of a terminal, a target blind detection budget of the terminal comprises:
determine, in a case that a first condition is satisfied, that a first blind detection upper limit is equal to 0 and/or that a second blind detection upper limit is equal to a maximum blind detection quantity of control elements of the second cell; wherein the first blind detection upper limit is a maximum blind detection quantity of control elements of the first cell that schedule the second cell, and the second blind detection upper limit is a maximum blind detection quantity of self-scheduling control elements of the second cell; and the first condition comprises at least one of the following:
third control information is transmitted or received, wherein the third control information indicates that the first cell or a first cell group is dormant, and the first cell group is a cell group in which the first cell is located;
the first cell is deactivated;
a bandwidth part (BWP) of the first cell is switched to a BWP that does not support scheduling of the second cell; or
the BWP of the first cell is deactivated.

11. The communication device according to claim 10, wherein the scheduling configuration of the first cell and/or the second cell comprises any one of the following: a first scheduling configuration, a second scheduling configuration, or a third scheduling configuration, wherein
the first scheduling configuration is that the second cell supports scheduling by the first cell and the second cell does not support self-scheduling, or the second cell supports scheduling by the first cell and the second cell does not support scheduling of any cell;
the second scheduling configuration is that control information in a common search space of the second cell supports self-scheduling by the second cell, and the second cell supports scheduling by the first cell; and
the third scheduling configuration is that control information in the common search space and a terminal-specific search space of the second cell supports scheduling of the second cell, and the second cell supports scheduling by the first cell.

12. The communication device according to claim 11, wherein it is determined that the scheduling configuration is the first scheduling configuration in a case that at least one of the following is satisfied:
first control information is transmitted or received, wherein the first control information indicates that the second cell or a second cell group is dormant, and the second cell group is a cell group in which the second cell is located;
the second cell is deactivated;
a BWP of the second cell is switched to a BWP that does not support scheduling of the second cell; or
the BWP of the second cell is deactivated.

13. The communication device according to claim 11, wherein the program or the instruction, when executed by the processor, causes the communication device to:
determine, in a case that the scheduling configuration is the first scheduling configuration, that the first blind detection upper limit is equal to a maximum blind detection quantity of the control elements of the second cell; or
determine, in a case that the scheduling configuration is the first scheduling configuration, that the second blind detection upper limit is equal to 0.

14. The communication device according to claim 11, wherein the program or the instruction, when executed by the processor, causes the communication device to:
determine the target blind detection budget by using first maximum blind detection parameters corresponding to the first scheduling configuration if the scheduling configuration is the first scheduling configuration,
wherein the terminal is further provided with second maximum blind detection parameters, and the first maximum blind detection parameters and the second maximum blind detection parameters satisfy at least one of the following:
a first blind detection upper limit in the first maximum blind detection parameters is greater than a first blind detection upper limit in the second maximum blind detection parameters, wherein the first blind detection upper limit is a maximum blind detection quantity of control elements of the first cell that schedule the second cell; or
a third blind detection upper limit in the first maximum blind detection parameters is greater than a third blind detection upper limit in the second maximum blind detection parameters, wherein the third blind detection upper limit is a maximum blind detection quantity of the control elements of the first cell.

15. The communication device according to claim 11, wherein the program or the instruction, when executed by the processor, causes the communication device to:
determine, in a case that the scheduling configuration is the first scheduling configuration, that a fourth blind detection upper limit is equal to 0, wherein the fourth blind detection upper limit is a maximum blind detection quantity of the control elements of the second cell; or
determine the target blind detection budget by using third maximum blind detection parameters corresponding to the first scheduling configuration,
wherein the terminal is further provided with fourth maximum blind detection parameters, and the third maximum blind detection parameters and the fourth maximum blind detection parameters satisfy at least one of the following:
a fourth blind detection upper limit in the third maximum blind detection parameters is equal to 0, wherein the fourth blind detection upper limit is the maximum blind detection quantity of the control elements of the second cell;
a third blind detection upper limit in the third maximum blind detection parameters is greater than a fourth blind detection upper limit in the fourth maximum blind detection parameters, wherein the third blind detection upper limit is a maximum blind detection quantity of the control elements of the first cell;
a fifth blind detection upper limit in the third maximum blind detection parameters is greater than a fifth blind detection upper limit in the fourth maximum blind detection parameters, wherein the fifth blind detection upper limit is a maximum blind detection quantity of self-scheduling control elements of the first cell;
a first blind detection upper limit in the third maximum blind detection parameters is greater than a sixth blind detection upper limit in the fourth maximum blind detection parameters, wherein the first blind detection upper limit is a maximum blind detection quantity of control elements of the first cell that schedule the second cell; or
a sixth blind detection upper limit in the third maximum blind detection parameters is greater than a sixth blind detection upper limit in the fourth maximum blind detection parameters, wherein the sixth blind detection upper limit is a maximum blind detection quantity of control elements of the first cell that schedule the first cell and a third cell.

16. The communication device according to claim 11, wherein the program or the instruction, when executed by the processor, causes the communication device to:
determine, in a case that the scheduling configuration is the first scheduling configuration, that the first blind detection upper limit is equal to a joint maximum blind detection quantity of the control elements of the first cell and the second cell;

determine, in a case that the scheduling configuration is the first scheduling configuration, that a seventh blind detection upper limit is equal to the joint maximum blind detection quantity of the control elements of the first cell and the second cell, wherein the seventh blind detection upper limit is a maximum blind detection quantity of control elements of the first cell that schedule the first cell and the second cell; or determine, in a case that the scheduling configuration is the first scheduling configuration, that an eighth blind detection upper limit is equal to the joint maximum blind detection quantity of the control elements of the first cell and the second cell, wherein the eighth blind detection upper limit is a maximum blind detection quantity of control elements of the first cell that schedule the second cell, the first cell, and a third cell.

17. The communication device according to claim 11, wherein the program or the instruction, when executed by the processor, causes the communication device to:

determine the target blind detection budget by using fifth maximum blind detection parameters corresponding to the first scheduling configuration in a case that the scheduling configuration is the first scheduling configuration, wherein the terminal is further provided with sixth maximum blind detection parameters, and the fifth maximum blind detection parameters and the sixth maximum blind detection parameters satisfy at least one of the following:

a first blind detection upper limit in the fifth maximum blind detection parameters is greater than a first blind detection upper limit in the sixth maximum blind detection parameters, wherein the first blind detection upper limit is a maximum blind detection quantity of control elements of the first cell that schedule the second cell; or a ninth blind detection upper limit in the fifth maximum blind detection parameters is greater than or less than a ninth blind detection upper limit in the sixth maximum blind detection parameters, wherein the ninth blind detection upper limit is a joint maximum blind detection quantity of the control elements of the first cell and the second cell.

18. The communication device according to claim 11, wherein the program or the instruction, when executed by the processor, causes the communication device to:

determine, in a case that the scheduling configuration is the second scheduling configuration or the third scheduling configuration, and that the first condition is satisfied, that the first cell does not support scheduling of the second cell, or that the first cell does not support scheduling of any cell; and determine, in a case of determining that the first cell does not support scheduling of the second cell, or that the first cell does not support scheduling of any cell, that the first blind detection upper limit is equal to 0 and/or that the second blind detection upper limit is equal to a maximum blind detection quantity of control elements of the second cell.

* * * * *